US012789675B2

(12) United States Patent
Leroy et al.

(10) Patent No.: US 12,789,675 B2
(45) Date of Patent: Nov. 10, 2026

(54) HEIGHT ADJUSTMENT SYSTEM FOR A SEAT AND METHOD FOR ASSEMBLING A HEIGHT ADJUSTMENT SYSTEM FOR A SEAT

(71) Applicant: FAURECIA Sièges d'Automobile, Nanterre (FR)

(72) Inventors: Véronique Leroy, Saint Cheron (FR); Luis Filipe Marques Abreu, Rouvres Saint Jean (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 219 days.

(21) Appl. No.: 18/588,908

(22) Filed: Feb. 27, 2024

(65) Prior Publication Data

US 2024/0286532 A1 Aug. 29, 2024

(30) Foreign Application Priority Data

Feb. 28, 2023 (FR) ...................................... 2301833

(51) Int. Cl.
*B60N 2/16* (2006.01)
*B60N 2/68* (2006.01)

(52) U.S. Cl.
CPC ........... *B60N 2/1615* (2013.01); *B60N 2/165* (2013.01); *B60N 2/68* (2013.01)

(58) Field of Classification Search
CPC .............................. B60N 2/1615; B60N 2/165
See application file for complete search history.

(56) References Cited

U.S. PATENT DOCUMENTS

| | | | | |
|---|---|---|---|---|
| 10,569,670 B2 * | 2/2020 | Mizukoshi | ........... | B60N 2/1615 |
| 10,640,016 B2 * | 5/2020 | Bonk | ..................... | B60N 2/045 |
| 11,235,685 B2 * | 2/2022 | Muehlenbrock | ....... | B60N 2/682 |
| 11,378,174 B2 * | 7/2022 | Römer | ................... | B60N 2/165 |
| 2021/0261023 A1 * | 8/2021 | Muehlenbrock | ....... | B60N 2/682 |
| 2022/0396180 A1 * | 12/2022 | Qian | .................... | B60N 2/0732 |
| 2023/0322130 A1 * | 10/2023 | Kumamoto | ............ | B60N 2/682 297/344.15 |

FOREIGN PATENT DOCUMENTS

| | | | | |
|---|---|---|---|---|
| CN | 110370998 A * | 10/2019 | ............. | B60N 2/165 |
| DE | 102013217741 A1 | 3/2015 | | |
| DE | 102017131095 A1 * | 6/2019 | ............. | B60N 2/165 |
| DE | 102018117927 A1 | 1/2020 | | |

* cited by examiner

*Primary Examiner* — Timothy J Brindley
(74) *Attorney, Agent, or Firm* — Barnes & Thornburg LLP

(57) ABSTRACT

A method for assembling a height adjustment system for a seat comprising a seat frame comprising at least one a flange extending a longitudinal direction and comprising, in a transverse direction, an inner side and an outer side, a first housing arranged on the first side of the flange in the transverse direction, and a drive module comprising an adjustment mechanism, the adjustment mechanism being arranged on a second side of the flange in the transverse direction, opposite the first side, coincident with the other of the inner side or the outer side, wherein the first housing, the flange and the drive module are secured together by at least one permanent fastening means, such as a weld or such as adhesive.

13 Claims, 12 Drawing Sheets

HEIGHT ADJUSTMENT SYSTEM FOR A SEAT AND METHOD FOR ASSEMBLING A HEIGHT ADJUSTMENT SYSTEM FOR A SEAT

PRIORITY CLAIM

This application claims priority to French Patent Application No. FR2301833, filed Feb. 28, 2023, which is expressly incorporated by reference herein.

BACKGROUND

The present disclosure relates to a height adjustment system for a seat and to a method for assembling such a height adjustment system for a seat

SUMMARY

According to the present disclosure, a method for assembling a height adjustment system for a seat is proposed, the height adjustment system comprising:

a seat frame comprising at least:

- a flange extending a longitudinal direction and comprising, in a transverse direction, an inner side and an outer side, and
- a connecting rod pivotably articulated about a first transverse axis relative to the flange, the connecting rod being arranged on a first side of the flange in the transverse direction, coinciding with either the inner side or the outer side, the connecting rod comprising at least one toothed sector;

a first housing arranged on the first side of the flange in the transverse direction, the toothed sector of the connecting rod being arranged transversely between the first housing and the first side of the flange;

a drive module comprising at least:

- an adjustment mechanism, the adjustment mechanism being arranged on a second side of the flange in the transverse direction, opposite the first side, coincident with the other of the inner side or the outer side,
- an output member extending along a second transverse axis, a first end portion of the output member cooperating with the adjustment mechanism so as to be able to rotate the output member about the second transverse axis, the output member extending through a first opening through the flange and a second opening through the first housing, a second end portion of the output member being arranged on a first side of the first housing that is opposite the flange in the transverse direction, the output member further comprising at least one pinion arranged at least partially between the flange and the first housing in the transverse direction and cooperating with the toothed sector of the connecting rod;

the method comprising the steps:

A. holding the output member of the drive module, by means of tooling, in a holding position for which the outlet member is aligned along the second transverse axis relative to the flange;

B. applying a force to the connecting rod in the longitudinal direction so as to eliminate any clearance between the toothed sector of the connecting rod and the pinion of the output member;

C. Securing, in particular by at least one permanent fastening means such as a weld (70) or an adhesive, the first housing, the flange and the drive module.

and wherein steps B and C are carried out while the output member is in the holding position.

A fastening means is the to be "permanent" unlike a removable fastening means such as a screw, a bolt or tongue crimping, for example. Alternatively, "permanent fastening means" can be named "non-removable fastening means".

The tooling may comprise a first member arranged on the first side of the flange and a second member arranged on the second side of the flange. The first member is arranged on the first side of the first housing in the transverse directions.

Step A may comprise the steps of:

A1. Engaging the second end portion of the output member with the first member such that the second end portion and the first member are constrained to rotate and translate in any direction perpendicular to the transverse direction;

A2. Engaging the adjustment mechanism with the second member so that the adjustment mechanism and the second member are constrained to rotate and translate in any direction perpendicular to the transverse direction;

A3. Securing the first member and the second member to the flange; and so that the alignment of the output member in the holding position in step A is obtained by the simultaneous implementation of steps A1, A2, A3.

The first member may comprise a first recess, the first recess and the second end portion of the bearing member having a substantially complementary shape adapted to form an adjusted fit. The adjustment mechanism may comprise a second housing and the second member comprising a second housing, the second housing and the second housing of the adjustment mechanism having a substantially complementary shape adapted to form an adjusted fit. Step A1 may comprise:

A1_1. Positioning the first member on the first side of the first housing by transversely aligning the first recess and the second end portion of the output member, A1_2. Transversely moving the first member relative to the height adjustment system to insert the second end portion of the output member into the first recess of the first member.

Step A2 may comprise:

A2_1. Positioning the second member on the second side of the flange by transversely aligning the second recess and the second housing of the adjustment mechanism, A2_2. Transversely moving the second member relative to the height adjustment system to insert the second housing of the adjustment mechanism into the second recess of the second member.

An adjusted fit between two elements is understood to be a clearance-free fit that allows sliding between these two elements.

The second end portion of the output member can be cylindrical in revolution about the second transverse axis. The first recess may be cylindrical in revolution about the second transverse axis. To allow the adjusted fit, the second end portion of the output member and the first recess may have a substantially equal diameter.

The second housing of the adjustment mechanism can be cylindrical in revolution about the second transverse axis. The second recess may be cylindrical in revolution about the second transverse axis. To allow the adjusted fit, the second housing and the first second may have a substantially equal diameter.

The first member can be moved transversely during step A1_2 until it bears, directly or indirectly, on the first side of the flange in the transverse direction. The second member can be moved transversely during step A2_2 until it bears, directly or indirectly, on the second side of the flange in the transverse direction. Step A3 may comprise applying a force along the transverse direction to at least either the first member or the second member so as to clamp the flange in the transverse direction between the first member and the second member.

The first housing may comprise a main wall extending substantially perpendicular to the transverse direction. The first member can be moved transversely during step A1_2 to a first side of the first member either by bearing, directly or indirectly, in the transverse direction on the first side of the first housing. The first side of the main wall of the first housing may have a shape complementary to the first side of the first member.

To do this, a device may be provided comprising a base on which the first member rests, an arm secured to the base, a jack mounted on the arm which comprises a piston sliding in the transverse direction, and a bearing member tight between the second member and the piston of the jack in the transverse direction.

The tooling may comprise a plurality of rods that each extend in the transverse direction from either the first member or the second member, the other one of the first member and the second member comprising a first series of secondary recesses, each being adapted to receive, interference-fitted, an end portion of one of the rods. The member provided with the rods can be moved along the transverse direction in step A1_2, or step A2_2, if applicable, by inserting each rod through a respective hole formed through the flange to place the end part of each rod on an opposite side of the flange relative to the member. The other member can be moved in the transverse direction in the other step among step A1_2 and step A2_2 by inserting the end part of each rod into one of the secondary recesses of the member in an interference fit.

An adjusted interference fit between two elements is understood to be a clearance-free fit that does not allow sliding between the two elements. Such a fit may also be simply called an interference fit.

The first member may be provided with rods. The first member may comprise a second series of secondary recesses in each of which one of the rods is an adjusted interference fit.

Each rod can be cylindrical in revolution. Each secondary recess can be cylindrical in revolution. Each secondary recess may have a diameter substantially smaller than a diameter of the corresponding rod.

The second member may comprise a bell that forms the second recess. The second member may comprise a plurality of tubular elements protruding radially outside the bell. Each tubular element may comprise one of the recesses of the first series of secondary recesses.

The first housing may comprise a tubular wall extending along the second transverse axis, the output member comprising an intermediate part that is arranged transversely between the pinion and the second end part and which is received in the tubular wall of the first housing, and wherein the first recess comprises a first part and a second part, the first part of the first recess and the tubular wall of the first housing having a substantially complementary shape adapted to form an adjusted fit, the second part of the first recess and the second end portion of the bearing member having a substantially complementary shape adapted to form an adjusted fit. The first member can be moved transversely during step A1_2 so as to insert the tubular wall of the first member into the first part of the first recess and the second end portion of the output member in the second part of the first recess.

The complementarity of shape between the first part of the recess and the tubular wall of the first member makes it possible to guide the output member in rotation at this end.

The first part of the first recess may be cylindrical in revolution about the second transverse axis. The second part of the first recess may be cylindrical in revolution about the second transverse axis. The tubular wall of the first member may be cylindrical in revolution about the first axis. To allow the adjusted fit, the second end portion of the output member and the second part of the first recess may have a substantially equal diameter. Also, the tubular wall of the first member and the first portion of the first recess may have a substantially equal diameter.

The first recess may comprise an undercut, or a widened or even collar portion, extended transversely by a hole, the undercut forming the first part and the hole forming the second part.

The first housing may comprise a first series of tabs, each tab of the first series being supported in the transverse direction on the first side of the flange, and wherein the adjustment mechanism comprises a second series of tabs, each tab of the second series of tabs bearing in the transverse direction on the second side of the flange, each tab of the second series of tabs being aligned with a tab of the first series of tabs in the transverse direction. During step C, a weld can be carried out at each transverse alignment between one of the tabs of the first series of tabs, the flange and one of the tabs of the second series of tabs.

Each tab of the first series of tabs can be rigidly connected to the main wall. The tubular wall may extend from the main wall in a direction of the transverse direction that is opposite the flange.

The drive mechanism may comprise a plate rigidly connected to the second housing. Each tab of the second series of tabs can be rigidly connected to the plate.

Each tab of the first series of tabs and each tab of the second series of tabs may comprise a respective hole adapted to have one of the rods pass through. The holes formed through each alignment of one of the tabs of the first series of tabs and one of the tabs of the second series of tabs in the transverse direction can be coaxial with one of the holes formed through the flange. The member provided with rods can be moved along the transverse direction in step A1_2, or step A2_2, if applicable, so as to insert each rod through respectively the hole of one of the tabs of the first series of tabs, one of the holes of the flange and the hole of one of the tabs of the second series of tabs.

The first series of tabs and the second series of tabs may each comprise 3 tabs.

The first series of series of tabs may comprise at least one rear tab arranged at a rear end of the first housing in the longitudinal direction. The rear tab may extend in the transverse direction by passing through a third opening through the connecting rod. The third opening may be of rounded shape about the first transverse axis.

The first series of tabs may comprise at least one front tab arranged at a front end of the first housing in the longitudinal direction. The first series of tabs may comprise two front tabs, which can furthermore be connected to each other.

The second series of series of tabs may comprise at least one rear tab arranged at a rear end of the plate in the longitudinal direction. The second series of tabs may comprise at least one front tab arranged at a front end of the plate in the longitudinal direction.

The fastening of the first housing, the flange, and the drive module in step C can be carried out by welding with or without the addition of material.

The fastening of the first housing, the flange, and the drive module in step C can be carried out by laser welding, preferably the laser beam being oriented in the transverse direction, more preferably in a path of the transverse direction going from the second side of the flange toward the first side of the flange.

The fastening of the first housing, the flange, and the drive module in step C can be carried out by MAG (Metal Active Gas) welding.

To this end, the housing may comprise at least one fastening opening (or window) and, for each fastening opening of the housing, the flange may comprise a first fastening opening (or first window) having an edge aligned in the transverse direction with an edge of the associated fastening opening of the housing, a weld bead being deposited together on the edge of the first fastening opening of the flange and the edge of the fastening opening of the housing to secure the housing to the flange. A fastening opening of the housing can be formed through each of the tabs of the first series of tabs. The adjustment mechanism may comprise at least one fastening opening (or window) and, for each fastening opening of the adjustment mechanism, the flange may comprise a second fastening opening (or second window) having an edge aligned in the transverse direction with an edge of the associated fastening opening of the adjustment mechanism, a weld bead being deposited together on the edge of the second fastening opening of the flange and the edge of the fastening opening of the adjustment mechanism so as to secure the adjustment mechanism to the flange. A fastening opening of the adjustment mechanism can be formed through each of the tabs of the second series of tabs. Each fastening opening of the housing is preferably aligned with one of the fastening openings of the adjustment mechanism in the transverse direction such that each first fastening opening of the flange can coincide (or can be merged) with one of the second fastening openings of the flange. The fastening opening(s) of the housing and the fastening opening(s) of the adjustment mechanism are preferably aligned two by two in the transverse direction.

The securing of the housing and the adjustment mechanism to the flange by at least one permanent fastening means can be combined with assembly by clinching or stamping, in particular at the tabs of the first series of tabs of the housing and of the second series of tabs of the adjustment mechanism.

The fastening of the first housing, the flange, and the drive module in step C can be carried out by CMT welding (Cold Metal Transfer).

The frame may comprise a cross-member extending along the first transverse axis, integral with the flange, the connecting rod being pivotably mounted on the cross-member about the first transverse axis, and wherein a pressure is exerted on the cross-member in step B so as to apply the longitudinal force to the connecting rod.

A height adjustment system is also proposed for a seat, in particular capable of being obtained by the method as described above. The height adjustment system for a seat may comprise:

- a seat frame comprising at least:
  - a flange extending a longitudinal direction of the seat and comprising, in a transverse direction, an inner side and an outer side, and
  - a connecting rod pivotably articulated about a first transverse axis relative to the flange, the connecting rod being arranged on a first side of the flange in the transverse direction, coinciding with either the inner side or the outer side, the connecting rod comprising at least one toothed sector;
- a first housing arranged on the first side of the flange in the transverse direction, the toothed sector of the connecting rod being arranged transversely between the first housing and the first side of the flange;
- a drive module comprising at least:
  - an adjustment mechanism, the adjustment mechanism being arranged on a second side of the flange in the transverse direction, opposite the first side, coincident with the other of the inner side or the outer side,
  - an output member extending along a second transverse axis, a first end portion of the output member cooperating with the adjustment mechanism so as to be able to be rotated about the second transverse axis, the output member passing through a first opening through the flange and a second opening through the first housing, a second end portion of the output member being arranged on a first side of the first housing that is opposite the flange in the transverse direction, the output member further comprising at least one pinion arranged at least partially on the first side of the flange, transversely between the flange and the first housing.

According to the present disclosure, the first housing, the flange and the drive module are secured together by at least one permanent fastening means, such as a weld or such as adhesive.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 comprises FIGS. 1*a* and 1*b* which represent a functional diagram of a method for assembling a height adjustment system for a seat;

DETAILED DESCRIPTION

Figure 1:
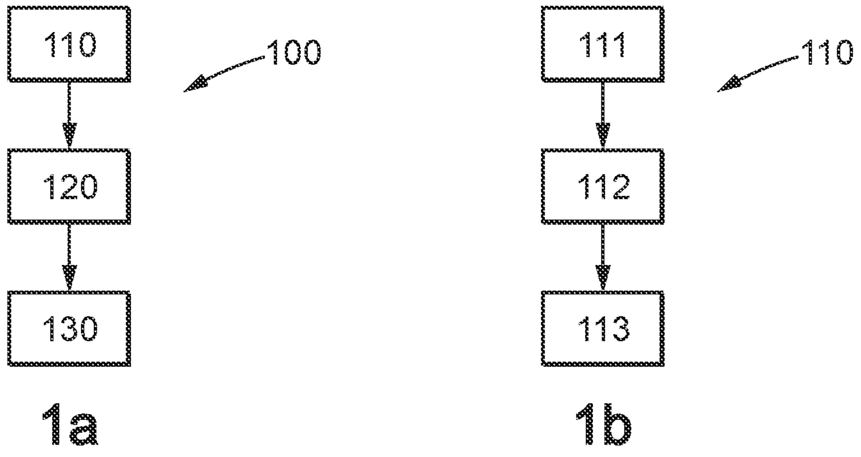

Referring to FIG. 1, a method 100 for assembling a height adjustment system for a seat is now described.

In the following description, when referring to terms qualifying absolute position, such as the terms "front", "rear", "top", "bottom", "left", "right", etc., or relative ones, such as the terms "above", "below", "upper", "lower", etc., or to qualifiers of orientation, such as "horizontal", "vertical", etc., reference is made, unless otherwise specified, to the orientation of the figures or the seat in its normal position of use.

In the following, the longitudinal direction X means the longitudinal direction of the seat. The longitudinal direction of the seat is considered to be the same as the longitudinal direction of the motor vehicle wherein the seat is mounted. This longitudinal direction corresponds to the normal direction in which the vehicle advances. The longitudinal direction X is preferably horizontal. The transverse direction Y is the transverse direction of the seat. The transverse direction Y of the seat thus corresponds to the transverse or lateral direction of the motor vehicle. This transverse direction Y corresponds to a direction perpendicular to the normal direction of travel of the vehicle. The transverse direction Y is preferably horizontal. Finally, the vertical direction Z is a vertical direction of the seat, perpendicular to the longitudinal X and transverse Y directions.

The height adjustment system first comprises a frame 10. In this case, it is a squab frame 10. The frame 10 comprises two flanges 11 each extending the longitudinal direction and comprising, in the transverse direction, an inner side and an outer side. The frame 10 comprises a tubular cross-member 16 extending along a first transverse axis and integral with each side in the transverse direction to each of the flanges 11. In this case, it is a rear cross-member 16 in that it connected on each side in the transverse direction to a rear end of each of the flanges 11. In the remainder of the description, unless otherwise specified, reference is only made to one of the flanges 11 to which the features described below relate. Here, this is the left flange 11, alternatively, alternatively, it could be the right flange 11 (subject to the reverse modifications of the position terms in the transverse direction mentioned below).

The frame 10 comprises a connecting rod 14 pivotably articulated on the cross-member 16 about the first transverse axis relative to the flange 11. The connecting rod 14 is arranged on a first side 12 of the flange 11 in the transverse direction, coinciding with the inner side. The connecting rod 14 comprises a toothed sector 15.

The height adjustment system comprises a first housing 30 arranged on the first side 12 of the flange 11 in the transverse direction. More particularly, the first housing 30 is integrally (or completely) arranged on the first side 12 of the flange 11 in the transverse direction. The first housing 30 comprises a main wall 31 extending substantially perpendicular to the transverse direction. The toothed sector 15 of the connecting rod 14 is arranged transversely between the first housing 30, in particular the main wall 31, and the first side 12 of the flange 11. The first housing 30 also comprises a tubular wall 33 extending along the second transverse axis, in a direction oriented toward the side of the main wall opposite the flange 11 in the transverse direction.

Finally, the height adjustment system comprises a drive module 20. The drive module 20 first comprises an adjustment mechanism 21. The adjustment mechanism 21 is arranged on a second side 13 of the flange 11 in the transverse direction, opposite the first side 12, thus coinciding with the outer side. More particularly, the adjustment mechanism 21 is integrally (or completely) arranged on the second side 13 of the flange 11 in the transverse direction. The adjustment mechanism 21 comprises a second housing 22. The drive mechanism comprises a plate 23 integral with the second housing 22, which extends substantially perpendicular to the transverse direction and intended for the fastening of the drive module 20 to the flange 11. The adjustment mechanism 21 may be of the manual or motorized type.

The drive module 20 also comprises an output member 25 extending along a second transverse axis. A first end portion 26 of the output member 25 cooperates with the adjustment mechanism 21 so as to be able to rotate the output member 25 about the second transverse axis. The output member 25 extends through a first opening 17 through the flange 11 and a second opening 35 through the first housing 30. A second end portion 27 of the output member 25 is thus arranged on a first side 12 of the first housing 30 that is opposite the flange 11 in the transverse direction, that is to say on the inner side of the first housing 30. The output member 25 further comprises at least one pinion 28 arranged in part between the flange 11 and the first housing 30 in the transverse direction. The pinion 28 meshes with the toothed sector 15 of the connecting rod 14. Finally, the output member 25 comprises an intermediate part 29 which is arranged transversely between the pinion 28 and the second end part and which is received in the tubular wall 33 of the first housing 30.

The assembly method 100 described below aims to assemble the first housing 30 and the drive module 20 to the flange 11 by eliminating any clearance between the teeth of the pinion 28 and the teeth of the toothed sector 15 of the connecting rod 14.

The method 100 comprises a first step 110 represented in FIGS. 2 to 9. The first step 110 comprises holding the output member 25 of the drive module 20, by means of tooling, in a holding position for which the output member 25 is aligned along the second transverse axis A2 relative to the flange 11.

The tooling comprises a first member 40 arranged on the first side 12 of the flange 11 and a second member 50 arranged on the second side 13 of the flange 11 in the transverse direction Y. The first member 40 and the second member 50 are more particularly visible in FIGS. 2 to 7.

The first member 40 extends substantially perpendicular to the transverse direction Y. The first member 40 comprises a first housing 42. The first recess 42 comprises a first part 42*a* and a second part 42*b*. The first part 42*a* of the first recess 42 and the tubular wall 33 of the first housing 30 have a substantially complementary shape adapted to form an adjusted fit. The second part 42*b* of the first recess 42 and the second end portion 27 of the bearing member have a substantially complementary shape adapted to form an adjusted fit. An adjusted fit between two elements is understood to be a clearance-free fit that allows sliding between these two elements. Here, the second end portion 27 of the output member 25 is cylindrical in revolution about the second transverse axis A2. The first part 42*a* of the first recess 42 is cylindrical in revolution about the second transverse axis A2. The second part 42*b* of the first recess 42 is also cylindrical in revolution about the second transverse axis A2. The tubular wall 33 of the first member 40 is finally also cylindrical in revolution about the first axis. To allow the adjusted fit, the second end portion 27 of the output member 25 and the second part 42*b* of the first recess 42 have a substantially equal diameter. Also, to allow an adjusted fit, the tubular wall 33 of the first member 40 and the first part 42*a* of the first recess 42 have a substantially equal diameter. The complementarity of shape between the first part 42*a* of the first recess 42 and the tubular wall 33 of the first member 40 makes it possible to guide the output member 25 in rotation at this end. The diameter of the first part 42*a* of the first recess 42 is here greater than the diameter of the second part 42*b* of the first recess 42. In this case, the first recess 42 comprises an undercut extended transversely by a hole, the undercut forming the first part 42*a* and the hole forming the second part 42*b*.

Likewise, the second member 50 comprises a second recess 52. The second member 50 may comprise a bell 51 (that is to say a base with a lateral skirt) that forms the second recess 52. The second recess 52 and the second housing 22 of the adjustment mechanism 21 have a substantially complementary shape adapted to form an adjusted fit. The second housing 22 of the adjustment mechanism 21 is here cylindrical in revolution about the second transverse axis A2 and the second recess 52 is cylindrical in revolution about the second transverse axis A2. To allow the adjusted fit, the second housing 22 and the first second may have a substantially equal diameter.

Figure 2:
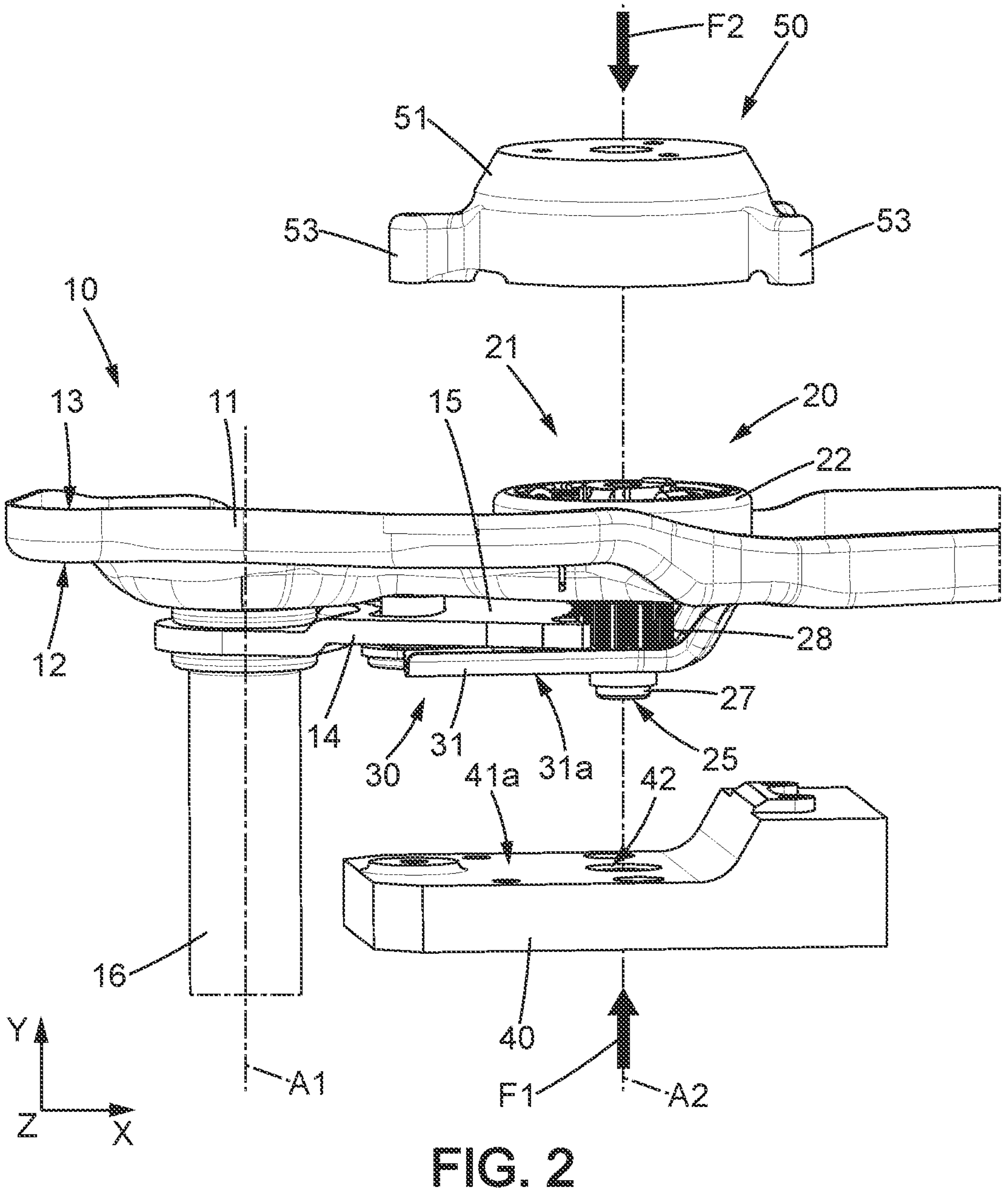
FIG. 2 shows a partial top view of the seat during a first step and a second step of the method of FIG. 1.
Figure 3:
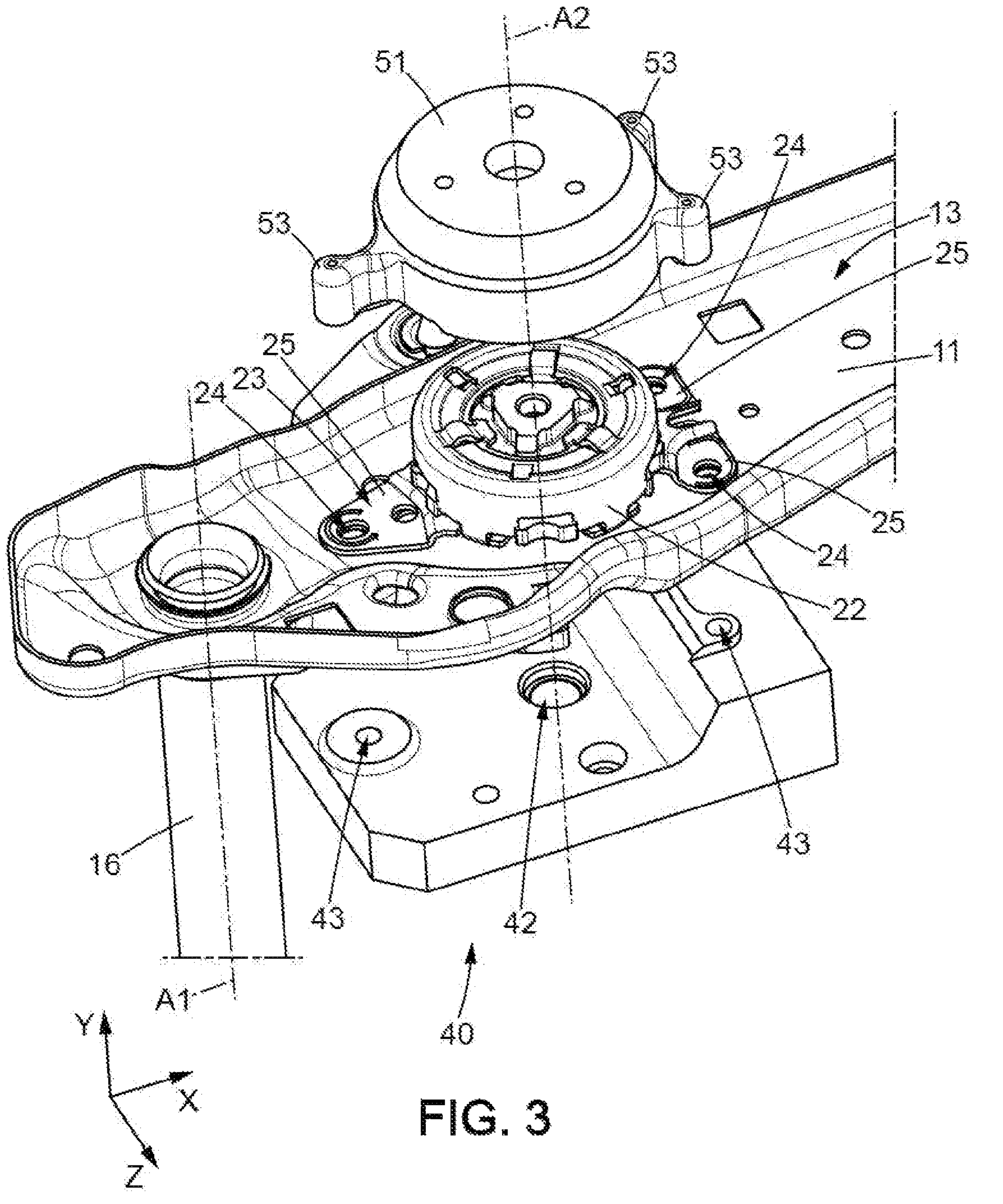
FIG. 3 shows a partial perspective view of the seat during the first step and the second step of the method of FIG. 1.

The first step 110 comprises a first subsidiary step 111 represented in FIG. 2. The first subsidiary step 111 of the first step 110 comprises the engaging of the second end portion 27 of the output member 25 with the first member 40 so that the second end portion 27 and the first member 40 are constrained to rotate and translate in any direction perpendicular to the transverse direction Y. To do this, the first member 40 is positioned on the first side 12 of the first housing 30 by transversely aligning the first recess 42 and the second end portion 27 of the output member 25, then the first member 40 is moved transversely the first member 40 relative to the height adjustment system (shown by the arrow F1 in FIG. 2) to insert the second end portion 27 of the output member 25 into the first recess 42 of the first member 40. In particular, the first member 40 is moved transversely so as to insert the tubular wall 33 of the first member 40 into the first part 42*a* of the first recess 42 and the second end portion 27 of the output member 25 in the second part 42*b* of the first recess 42. The first member 40 is finally moved transversely until it bears on the first side 12 of the flange 11 in the transverse direction Y, here by means of the first housing 30. In other words, the first member 40 is moved transversely to a first side 41*a* of the first member 40 or bears on the first side 31*a* of the first housing 30 in the transverse direction Y. The first side 31*a* of the main wall 31 of the first housing 30 has for this purpose a shape complementary to the first side 41*a* of the first member 40.

The first step 110 comprises a second subsidiary step 112 represented in FIG. 2. The second subsidiary step 112 of the first step 110 comprises engaging the adjustment mechanism 21 with the second member 50 so that the adjustment mechanism 21 and the second member 50 are constrained to rotate and translate in any direction perpendicular to the transverse direction Y. To this end, the second member 50 is positioned on the second side 13 of the flange 11 by transversely aligning the second recess 52 and the second housing 22 of the adjustment mechanism 21, then the second member 50 is moved transversely the second member 50 relative to the height adjustment system (shown by the arrow F2 in FIG. 2) to insert the second housing 22 of the adjustment mechanism 21 into the second recess 52 of the second member 50. The second member 50 is moved transversely until it bears on the second side 13 of the flange 11 in the transverse direction Y, here by means of the plate 23.

Figure 4:
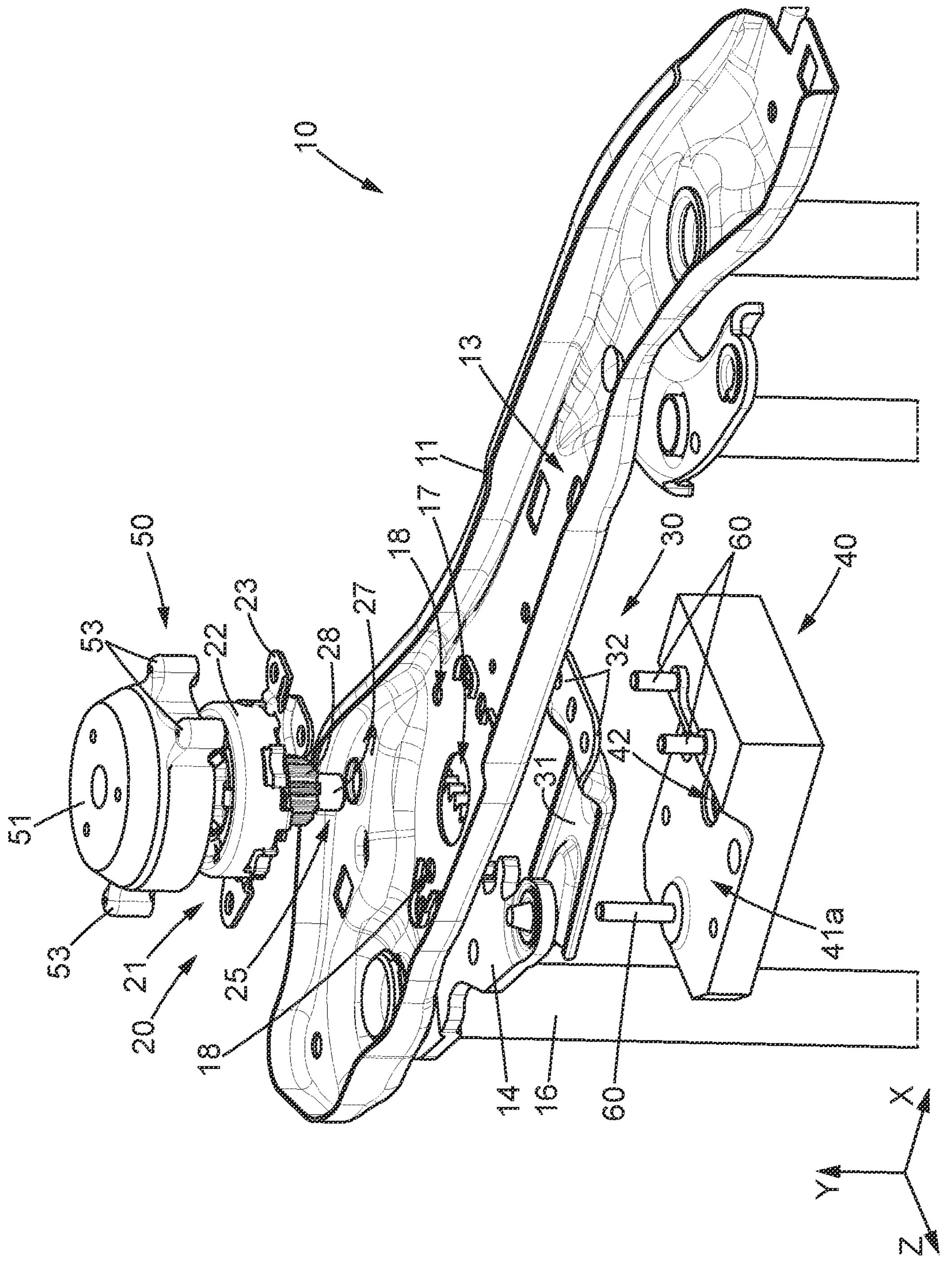
FIG. 4 shows an exploded view of the seat during the first step and the second step of the method of FIG. 1.
Figure 5:
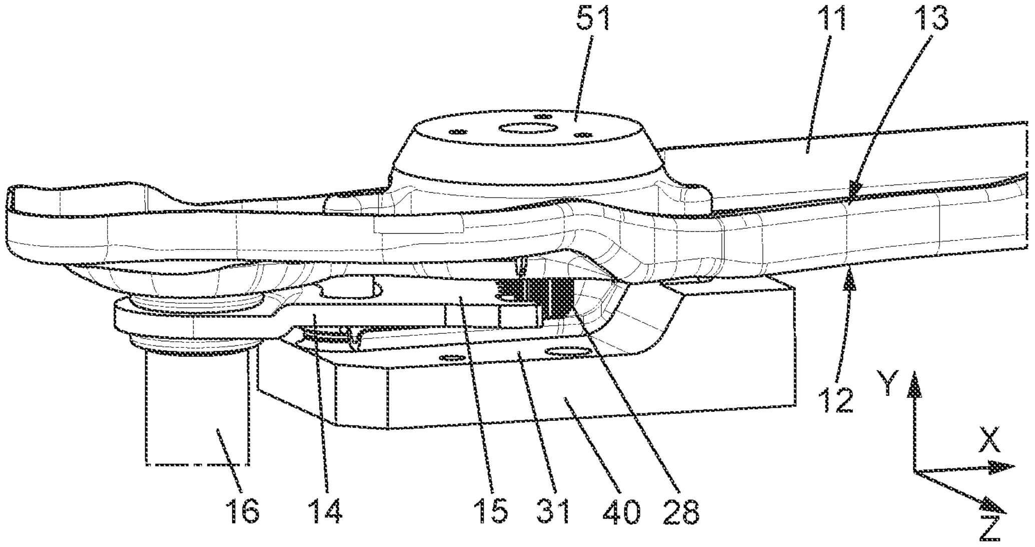
FIG. 5 shows a partial perspective view of the seat after the first step and the second step of the method of FIG. 1.
Figure 6:
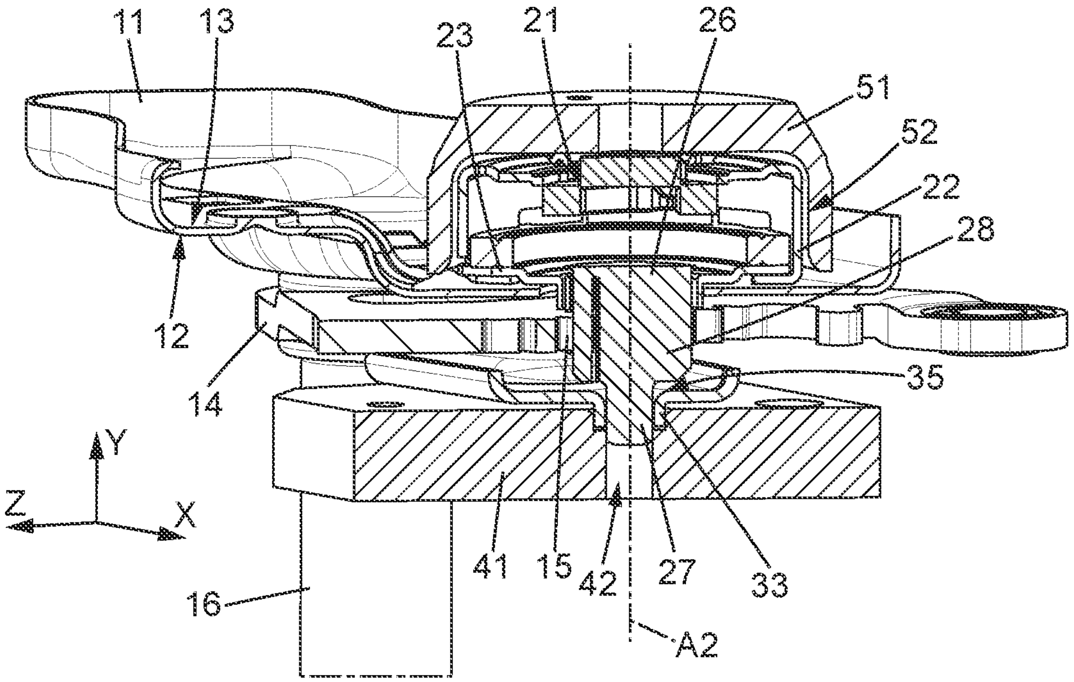
FIG. 6 shows a first partial sectional view of the seat after the first step and the second step of the method of FIG. 1.
Figure 7:
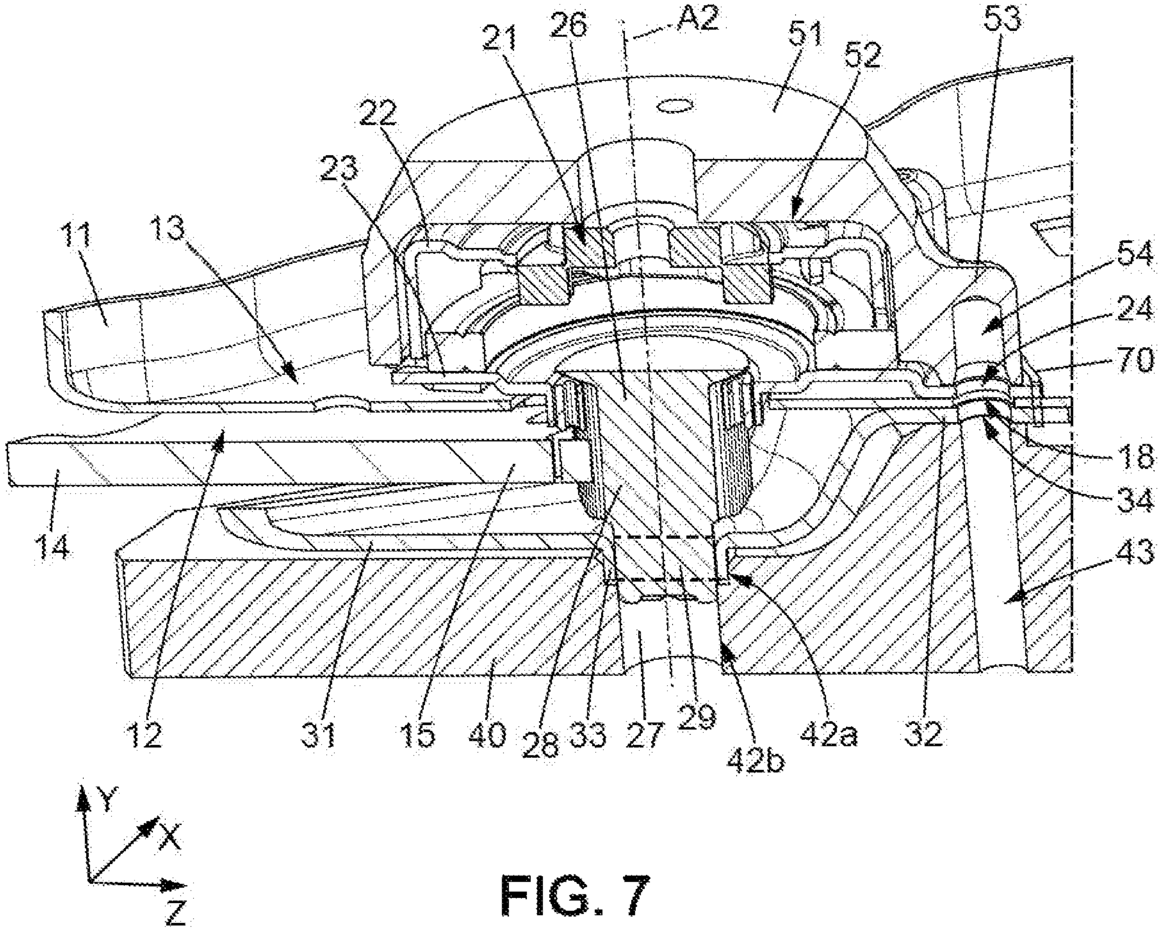
FIG. 7 shows a second partial sectional view of the seat after the first step and the second step of the method of FIG. 1.

The tooling further comprises a plurality of rods 60 visible in FIG. 4. Each rod 60 extends in the transverse direction Y from the first member 40. The second member further comprises a first series of secondary recesses 54 visible in FIG. 7, each being suitable for receiving, as an interference fit, an end part of one of the rods 60. To do so, the second member 50 comprise a plurality of tubular elements 53 protruding radially outside the bell 51. Each tubular element 53 comprises one of the recesses 54 of the first series of secondary recesses 54. It is understood here, and as will be described below, that before the implementation of the first step 110, the rods 60 are not received in the recesses 54 of the first series of secondary recesses 54. To connect the rods 60 to the first member 40, the first member 40 may comprise a second series of secondary recesses 43 in each of which one of the rods 60 is interference-fitted. An adjusted interference fit between two elements is understood to be a clearance-free fit that does not allow sliding between the two elements. Such a fit may also be simply called an interference fit. Each rod 60 is cylindrical in revolution. Each secondary recess 43, 54 is cylindrical in revolution. Each secondary recess 43, 54 has a diameter substantially smaller than a diameter of the corresponding rod 60.

During the first subsidiary step 111 of the first step 110, the first member 40 is moved along the transverse direction Y by inserting each rod 60 through a respective hole 18 formed through the flange 11 to place the end part of each rod 60 on the second side 13 of the flange 11. During the second subsidiary step 112 of the first step 110, the second member 50 is moved along the transverse direction Y by inserting the end part of each rod 60 into one of the secondary recesses 54 of the first series of secondary recesses 54 in an interference fit. Thus, an alignment is provided in the transverse direction Y between the first recess 42 of the first member 40 and the second recess 52 of the second member 50.

As more particularly visible in FIGS. 10 to 13, the first housing 30 comprises a first series of tabs 32. Each tab 32 of the first series bears in the transverse direction Y on the first side 12 of the flange 11. Each tab 32 of the first series of tabs 32 can be rigidly connected to the main wall 31. The first series of series of tabs 32 comprises a rear tab 32 arranged at a rear end of the first housing 30 in the longitudinal direction X. The rear tab 32 extends in the transverse direction Y passing through a third opening through the connecting rod 14. The third opening here has a rounded shape around the first transverse axis A1 to allow the connecting rod 14 to rotate about the first transverse axis A1. The first series of tabs 32 comprises two front tabs 32 each arranged at a front end of the first housing 30 in the longitudinal direction X. The two front tabs 32 are here connected to one another (that is single-piece).

Similarly, the adjustment mechanism 21 comprises a second series of tabs 23*a*. Each tab 23*a* of the second series of tabs 23*a* bears on the second side 13 of the flange 11 in the transverse direction Y. Each tab 23*a* of the second series of tabs 23*a* is integral with the plate 23. Each tab 23*a* of the second series of tabs 23*a* is aligned with a tab of the first series of tabs 23*a* in the transverse direction Y. The second series of tabs 23*a* therefore comprises a rear tab 23*a* and two front tabs 23*a*.

Each tab 32 of the first series of tabs 32 and each tab 23*a* of the second series of tabs 23*a* comprises a respective hole 34, 24 adapted to have one of the rods 60 pass through. The holes 34, 24 formed through each pair comprising one of the tabs 32 of the first series of tabs 32 and one of the tabs 23*a* of the second series of tabs 23*a* in the transverse direction Y are coaxial with one of the holes 18 formed through the flange 11. The first member 40 is then moved along the transverse direction Y, during the first subsidiary step 111 of the first step 110, so as to insert each rod 60 through the hole 34 of one of the tabs 32 of the first series of tabs 32, one of the holes 18 of the flange 11 and the hole 24 of one of the tabs 23*a* of the second series of tabs 23*a*.

Figure 8:
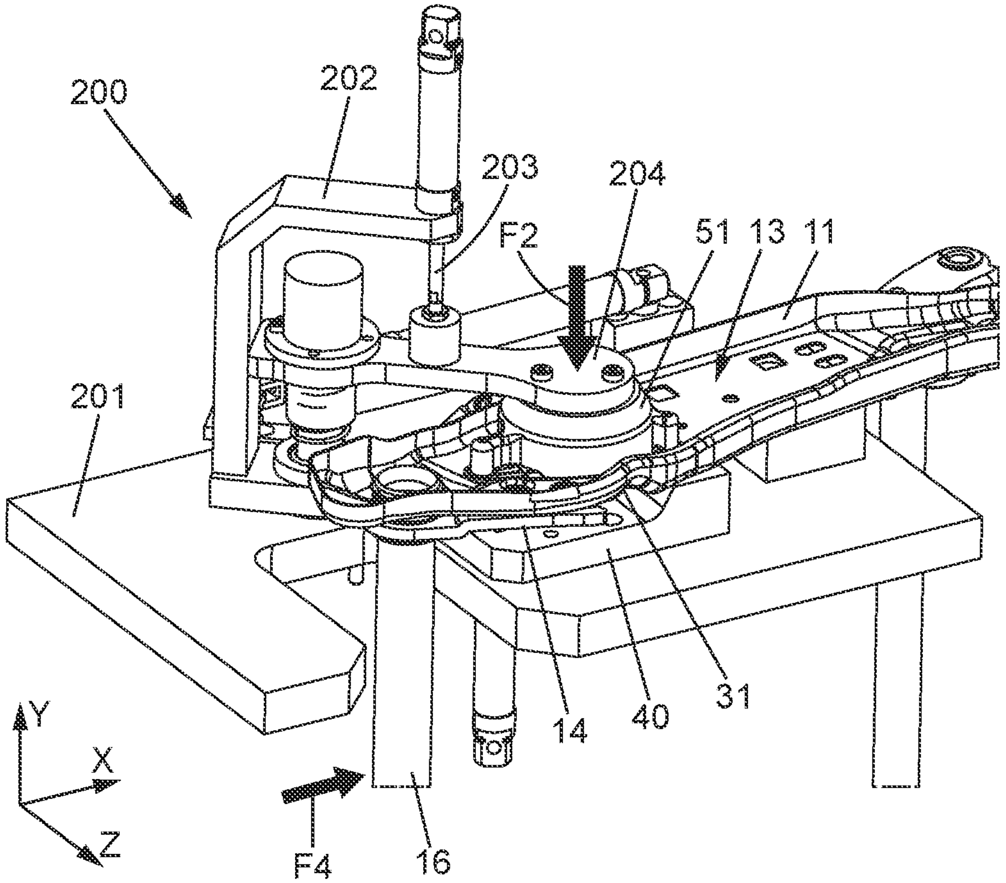
FIG. 8 shows a partial perspective view of the seat during a third step and a fourth step of the method of FIG. 1.
Figure 9:
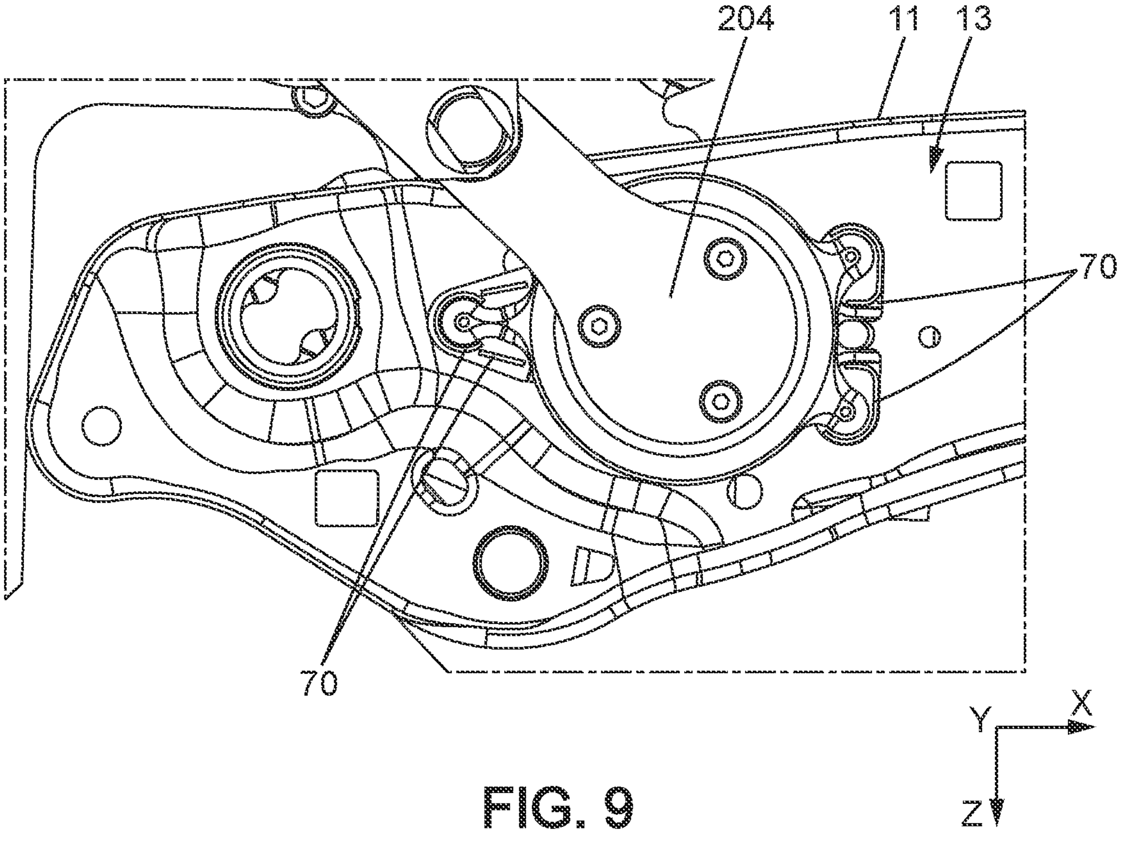
FIG. 9 shows a partial top view of the seat during the third step and the fourth step of the method of FIG. 1.
Figure 10:
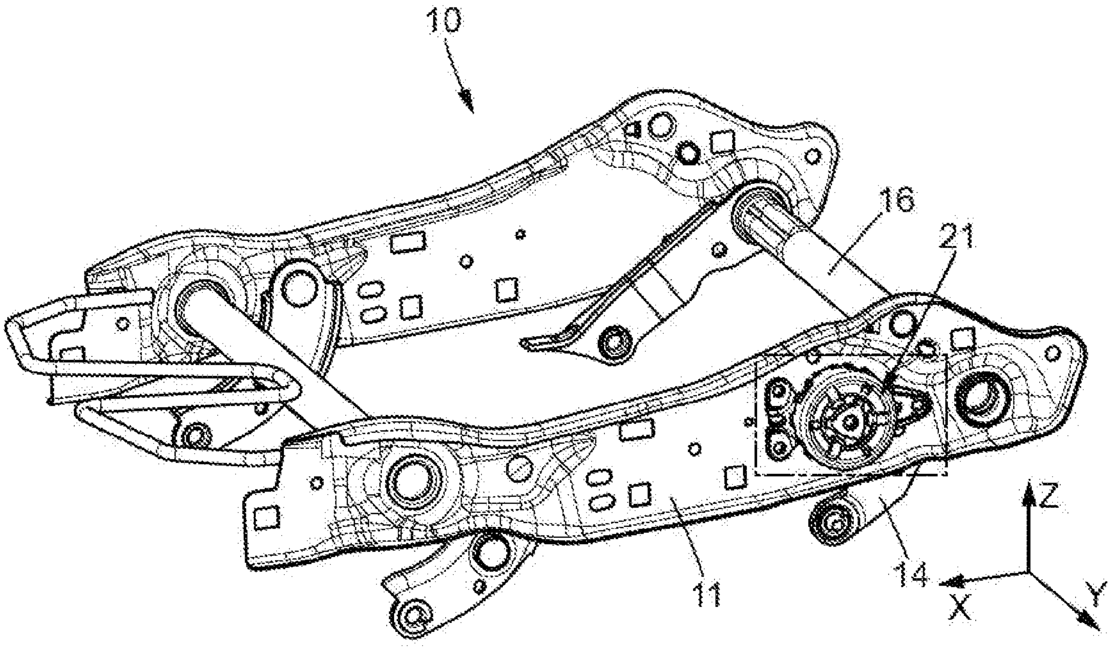
FIG. 10 shows a perspective view of a seat height adjustment system capable of being obtained by the method of FIG. 1.
Figure 11:
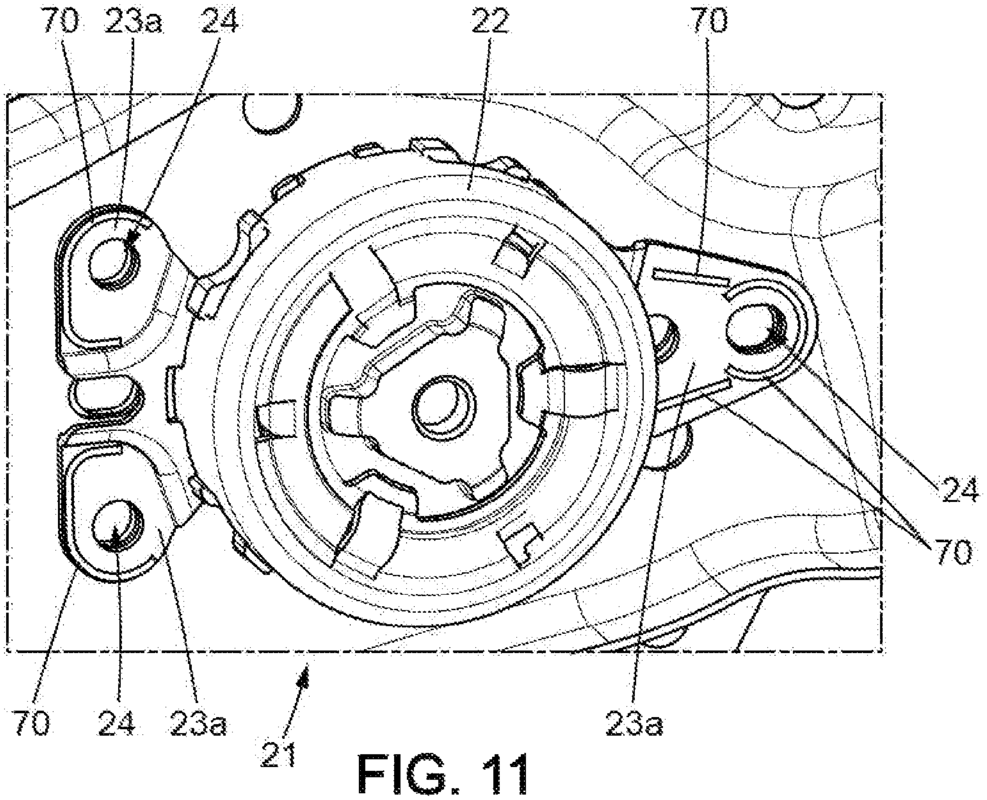
FIG. 11 shows a larger-scale view of the zone delimited by dotted lines in FIG. 10.
Figure 12:
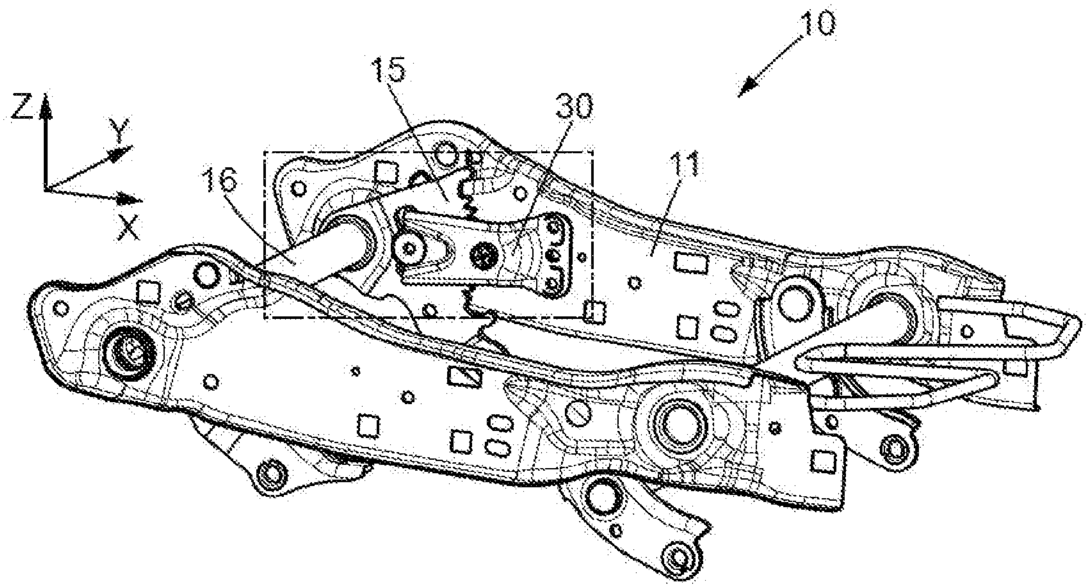
FIG. 12 shows another perspective view of the seat height adjustment system of FIG. 10.
Figure 13:
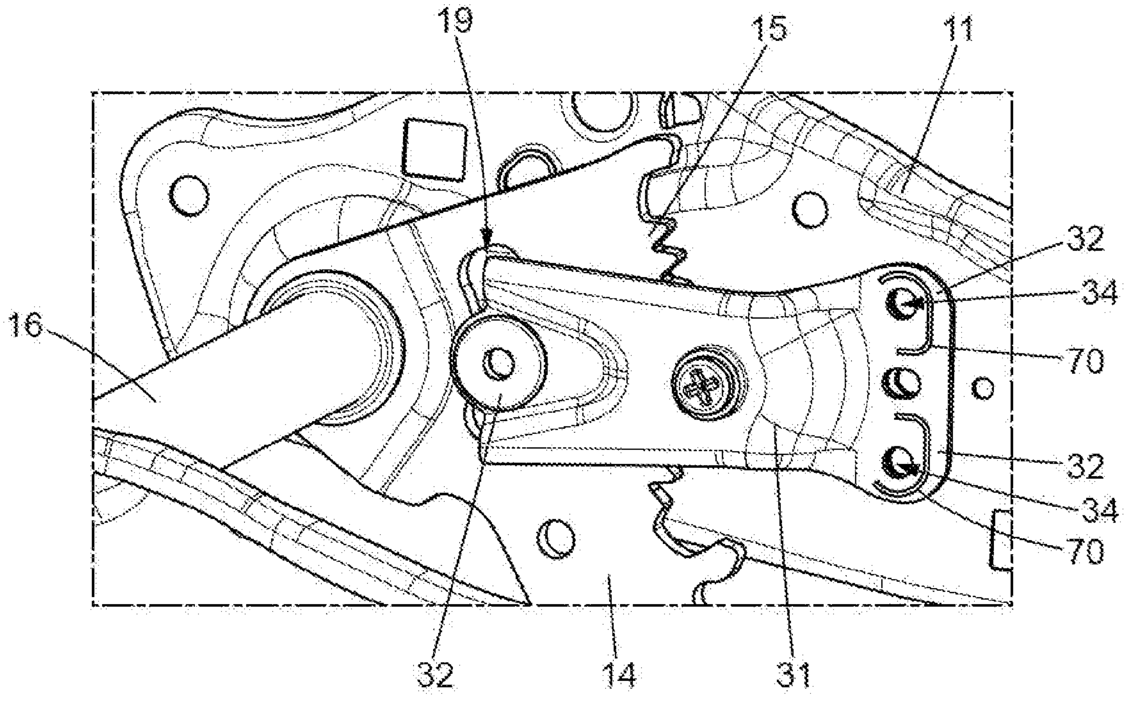
FIG. 13 shows a larger-scale view of the zone delimited by dotted lines in FIG. 12.

The first step 110 comprises a third subsidiary step 113 shown in FIGS. 8 and 9. The third subsidiary step 113 of the first step 110 comprises the securing of the first member 40 and the second member 50 to the flange 11. To this end, a force is exerted in the transverse direction Y on the second member 50 (shown by the arrow F3 in FIG. 8) and the first member 40 is held in position in the transverse direction Y so as to firmly tighten the flange 11 in the transverse direction Y between the first member 40 and the second member 50. The simultaneous implementation of the first, second and third subsidiary steps 130*s* then allows the output member 25 to be held in the holding position. It is understood here that the arrangement resulting from the first subsidiary step 111 and from the second subsidiary step 112 is maintained for the implementation of the third subsidiary step 113. However, the first subsidiary step 111 and the second subsidiary step 112 can be carried out, in whole or in part, simultaneously or in any order.

In order to carry out the third subsidiary step 113 of the first step 110, a device 200 is provided here comprising a base 201 on which the first member 40 rests in a fixed manner and which is therefore intended to hold it in position, in the transverse direction Y, an arm 202 secured to the base, a jack 203 mounted on the arm which comprises a piston sliding along the transverse direction Y, and a support member 204 clamped between the second member 50 and the piston of the jack in the transverse direction Y. The actuation of the jack thus exerts a force on the second member 50 in the transverse direction Y, by means of the bearing member. Also, in the example shown, the bearing member is attached by bolting to the second member 50.

The method 100 comprises a second step 120 shown in FIG. 8. The second step 120 comprises applying a force on the connecting rod 14 in the longitudinal direction X so as to eliminate any clearance between the toothed sector 15 of the connecting rod 14 and the pinion 28 of the output member 25. The second step 120 is carried out while the output member 25 is held in the holding position, therefore simultaneously with the first step 110. In other words, the implementation of the third subsidiary step 113 of the first step 110 is maintained (and therefore also that of the first subsidiary step 111 and the second subsidiary step 112 of the first step 110) for performing the second step 120. However, the first step 110 is preferably entirely carried out before initiating the second step 120. Thus, due to the holding of the output member 25 in the holding position (that is to say aligned along the second transverse axis A2), the application of the force on the connecting rod 14 does not have the effect of causing an over-center of the output member 25, which would impair the proper operation of the drive module 20. In the example shown, a force is exerted on the cross-member 16 forward (shown by the arrow F4 in FIG. 8) so as to apply the longitudinal force on the connecting rod 14.

The method 100 comprises a third step 130. The third step 130 comprises the fastening by welding of the first housing 30 and of the drive module 20 to the flange 11. The third step 130 is carried out simultaneously with the first step 110 and the second step 120. In other words, the implementation of the third subsidiary step 113 of the first step 110 (and therefore also that of the first subsidiary step 111 and the second subsidiary step 112 of the first step 110) and of the second step 120 are maintained for performing the third step 130. However, the first step 110 and the second step 120 are preferably entirely carried out before initiating the third step 130. An assembly is thus obtained of the first housing 30 and the drive module 20 on the flange 11 by providing an alignment of the output member 25 along the second transverse axis A2 and eliminating any clearance between the teeth of the pinion 28 and the teeth of the toothed sector 15 of the connecting rod 14.

Also visible in FIGS. 10 to 13, during the third step 130, a weld 70 is carried out at each transverse alignment between one of the tabs of the first series of tabs, the flange 11 and one of the tabs of the second series of tabs. The weld 70 may be carried out without addition of material, preferably by melting the first housing 30, the flange 11 and the adjustment mechanism 21 together.

The fastening of the first housing 30, the flange 11, and the drive module 20 is carried out by laser welding, preferably the laser beam being oriented in the transverse direction Y, more preferably in a path of the transverse direction going from the second side 13 of the flange 11 toward the first side 12 of the flange 11. It will be understood here that each weld 70 is made through several thicknesses, namely through the adjustment mechanism 21 (namely the plate of the adjustment mechanism 21), the flange 11 and the first housing 30. Remarkably, the first housing 30 and/or the adjustment mechanism 21 may be free of any tab projecting transversely (i.e. along the transverse direction Y) for being fastened with the flange. Also remarkably, one or more among (or even each of) the first housing 30, the flange 11 and the adjustment mechanism 21 may be free of any hole for being fastened to each other.

The present disclosure is not limited to the examples described above and is subject to numerous variants.

Figure 14:
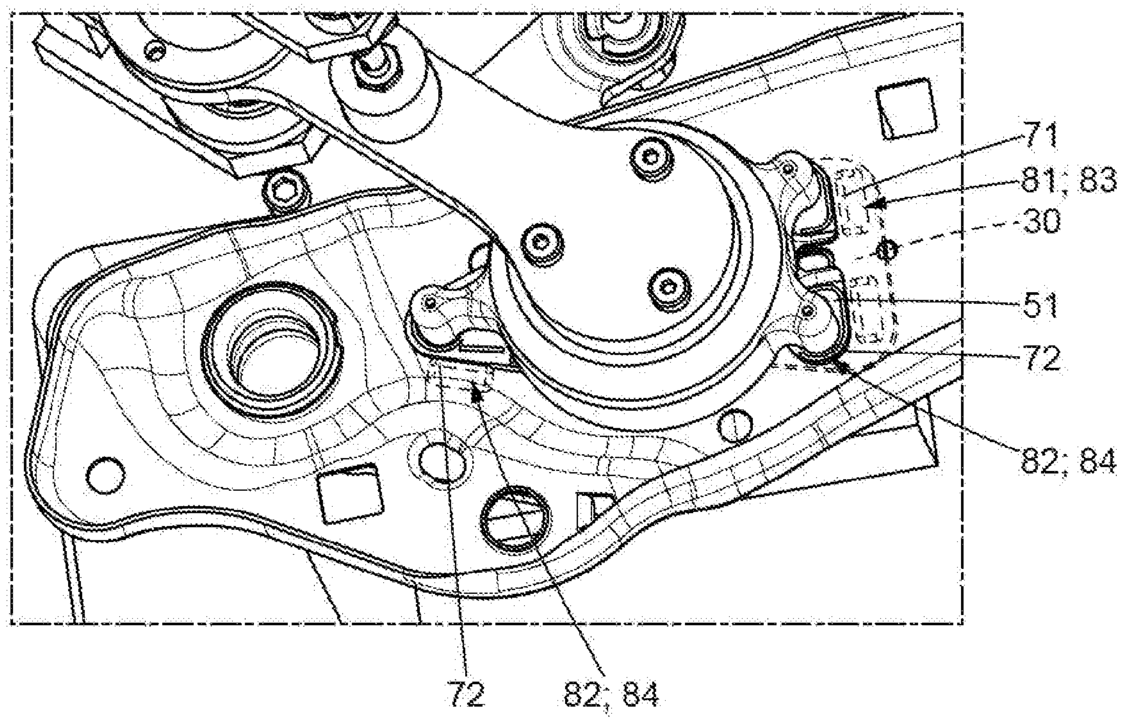
FIG. 14 shows a perspective view of a height adjustment system according to a variant embodiment of the method of FIG. 1.

FIG. 14 shows a variant wherein a fastening opening 81 of the housing 30 is formed through each of the tabs 32 of the first series of tabs 32 and a fastening opening 82 of the adjustment mechanism 51 can be formed through each of the tabs 23*a* of the second series of tabs 23*a*.

For each fastening opening 81 of the housing 30, the flange 11 comprises a first fastening opening 83 having an edge aligned in the transverse direction Y with an edge of the corresponding fastening opening 81 of the housing 30. A weld bead 71 is deposited together on the edge of each first fastening opening 83 of the flange 11 and on the edge of the corresponding fastening opening 81 of the housing 30 so as to secure the housing 30 to the flange 11.

For each fastening opening 82 of the adjustment mechanism 51, the flange 11 comprises a second fastening opening 84 having an edge aligned in the transverse direction Y with an edge of the corresponding fastening opening 82 of the adjustment mechanism 51. A weld bead 72 is deposited together on the edge of each second fastening opening 84 of the flange 11 and on the edge of the corresponding fastening opening 82 of the adjustment mechanism 51 so as to secure the adjustment mechanism 51 to the flange 11.

“Edge” of the fastening openings 81, 82, 83, 84 means the inner wall of the openings.

The weld bead can be deposited by a MAG welding method.

The height of at least a part of a vehicle, seat, in particular, a squab of the vehicle seat may be adjusted.

To do this, there are manual adjustment mechanisms, allowing the adjustment of the height of the seat under the manual actuation energy of the occupant of the seat, for example by a pumping movement on an input member of the irreversible adjustment mechanism which is rigidly connected to a flange of the squab frame (also called the squab chassis or squab armature) whose height is adjustable. These pumping movements drive an output member of the adjustment mechanism, for example, with a toothed pinion which meshes with a toothed sector, for example, belonging to an articulated connection connecting the squab frame, whose height is adjustable, to a part whose height is fixed. There are also motorized adjustment mechanisms for which the actuation energy is produced by an electric actuator.

The irreversible adjustment mechanism is mounted on the flange, for example, on the outer side of the flange, namely on the side from which the operating handle drives the input member of the mechanism, and a housing attached to the other side of the flange, namely on the inner side. The housing forms a recess for the pinion, protruding from an opening of the flange, on the side where the pinion meshes with the toothed sector (or with the rack).

One of the objectives of such an assembly is to control the clearance of the mesh formed between the toothed pinion and the toothed sector (or the rack). Indeed, a clearance between the pinion forming the output member and the toothed sector (or the rack) does not make it possible to maximize good contact between the teeth of the pinion and those of the toothed sector (or the rack) in the event of a crash. Also, and in the case of a presence of an uncontrolled clearance, the contact between the teeth is insufficient to prevent the teeth from breaking when subjected to the stresses generated by the crash.

Furthermore, the clearance generates noise during the operations of adjusting the height, which can be detrimental to the comfort of an occupant of the seat.

According to a first comparative method of assembly, the adjustment mechanism and the housing are assembled to the flange by bolts. The screws of the bolts pass through orifices in the adjustment mechanism, orifices in the flange and orifices in the housing, on the other side of the flange relative to the irreversible adjustment mechanism.

The tightening by screwing of the bolts makes it possible to secure the position of the assembly (namely the irreversible adjustment mechanism on one side of the flange, and the housing on the other side of the flange), the positions of the housing and of the irreversible adjustment mechanism being secured simultaneously, during the tightening of the screws. Significantly, and according to this assembly technique by tightening bolts, the holes made in the wall of the flange of the squab frame are intentionally extra-large relative to the cross-section of the screws, for example, in the form of oblong holes. These oblong holes make it possible to adjust the position of the assembly, by bringing the pinion of the assembly closer to (or further from) the teeth of the toothed sector (or of the rack). These oblong holes advantageously allow such an adjustment and thus make it possible to best adjust the operating clearance between the toothing of the pinion and that of the toothed sector (or rack) until the clearance between the teeth of the mechanism pinion and those of the toothed sector (or rack) is eliminated.

This first comparative assembly method however has the disadvantage of requiring additional parts beyond the irreversible adjustment mechanism and housing for assembly, namely bolts.

According to a second comparative method of assembly, the fastening is carried out by tabs of the housing inserted into orifices for securing the flange from the inner side of the flange, which are then folded and pressed against the flange on the opposite side, namely folded on the outer side, then successively by tabs of the irreversible adjustment mechanism, which are inserted from the outer side into orifices in the flange, or even for some simultaneously into orifices in a plate of the housing, and which are then folded, on the inner side of the flange.

The elimination of the clearance from the gearing (between the pinion and a toothed sector) is provided, without adjusting the position of the assembly on the flange, by controlling the theoretical tolerance stack-up of the parts and assembly methods, and by careful positioning of the housing on the squab flange.

This method does not require additional parts for assembly, however this method is still not completely satisfactory in the event of a crash in that there is always sliding between the housing and irreversible adjustment mechanism, which may cause an impact that unlocks of the locking members, and therefore undesired unlocking of the output member. In addition, in practice, controlling the parts' tolerance stack-up is not sufficient to minimize the clearance for each seat manufactured according to this method and leads to an additional cost beyond the tools necessary for implementing this method.

A method for assembling a height adjustment system for a seat is proposed, the height adjustment system comprising:

- a seat frame comprising at least:
  - a flange extending a longitudinal direction and comprising, in a transverse direction, an inner side and an outer side, and
  - a connecting rod pivotably articulated about a first transverse axis relative to the flange, the connecting rod being arranged on a first side of the flange in the transverse direction, coinciding with either the inner side or the outer side, the connecting rod comprising at least one toothed sector;
- a first housing arranged on the first side of the flange in the transverse direction, the toothed sector of the connecting rod being arranged transversely between the first housing and the first side of the flange;
- a drive module comprising at least:
  - an adjustment mechanism, the adjustment mechanism being arranged on a second side of the flange in the transverse direction, opposite the first side, coincident with the other of the inner side or the outer side,
  - an output member extending along a second transverse axis, a first end portion of the output member cooperating with the adjustment mechanism so as to be able to rotate the output member about the second transverse axis, the output member extending through a first opening through the flange and a second opening through the first housing, a second end portion of the output member being arranged on a first side of the first housing that is opposite the flange in the transverse direction, the output member further comprising at least one pinion arranged at least partially between the flange and the first housing in the transverse direction and cooperating with the toothed sector of the connecting rod;

the method comprising the steps:

A. holding the output member of the drive module, by means of tooling, in a holding position for which the outlet member is aligned along the second transverse axis relative to the flange;

B. applying a force to the connecting rod in the longitudinal direction so as to eliminate any clearance between the toothed sector of the connecting rod and the pinion of the output member;

C. Securing, in particular by at least one permanent fastening means such as a weld (70) or an adhesive, the first housing, the flange and the drive module, and wherein steps B and C are carried out while the output member is in the holding position.

A fastening means is the to be "permanent" unlike a removable fastening means such as a screw, a bolt or tongue crimping, for example. Alternatively, "permanent fastening means" can be named "non-removable fastening means".

The tooling may comprise a first member arranged on the first side of the flange and a second member arranged on the second side of the flange. The first member is arranged on the first side of the first housing in the transverse direction.

Step A may comprise the steps of:

A1. Engaging the second end portion of the output member with the first member such that the second end portion and the first member are constrained to rotate and translate in any direction perpendicular to the transverse direction;

A2. Engaging the adjustment mechanism with the second member so that the adjustment mechanism and the second member are constrained to rotate and translate in any direction perpendicular to the transverse direction;

A3. Securing the first member and the second member to the flange;

and so that the alignment of the output member in the holding position in step A is obtained by the simultaneous implementation of steps A1, A2, A3.

The first member may comprise a first recess, the first recess and the second end portion of the bearing member having a substantially complementary shape adapted to form an adjusted fit. The adjustment mechanism may comprise a second housing and the second member comprising a second housing, the second housing and the second housing of the adjustment mechanism having a substantially complementary shape adapted to form an adjusted fit. Step A1 may comprise:

A1_1. Positioning the first member on the first side of the first housing by transversely aligning the first recess and the second end portion of the output member, A1_2. Transversely moving the first member relative to the height adjustment system to insert the second end portion of the output member into the first recess of the first member.

Step A2 may comprise:

A2_1. Positioning the second member on the second side of the flange by transversely aligning the second recess and the second housing of the adjustment mechanism, A2_2. Transversely moving the second member relative to the height adjustment system to insert the second housing of the adjustment mechanism into the second recess of the second member.

An adjusted fit between two elements is understood to be a clearance-free fit that allows sliding between these two elements.

The second end portion of the output member can be cylindrical in revolution about the second transverse axis. The first recess may be cylindrical in revolution about the second transverse axis. To allow the adjusted fit, the second end portion of the output member and the first recess may have a substantially equal diameter.

The second housing of the adjustment mechanism can be cylindrical in revolution about the second transverse axis. The second recess may be cylindrical in revolution about the second transverse axis. To allow the adjusted fit, the second housing and the first second may have a substantially equal diameter.

The first member can be moved transversely during step A1_2 until it bears, directly or indirectly, on the first side of the flange in the transverse direction. The second member can be moved transversely during step A2_2 until it bears, directly or indirectly, on the second side of the flange in the transverse direction. Step A3 may comprise applying a force along the transverse direction to at least either the first member or the second member so as to clamp the flange in the transverse direction between the first member and the second member.

The first housing may comprise a main wall extending substantially perpendicular to the transverse direction. The first member can be moved transversely during step A1_2 to a first side of the first member either by bearing, directly or indirectly, in the transverse direction on the first side of the first housing. The first side of the main wall of the first housing may have a shape complementary to the first side of the first member.

To do this, a device may be provided comprising a base on which the first member rests, an arm secured to the base, a jack mounted on the arm which comprises a piston sliding in the transverse direction, and a bearing member tight between the second member and the piston of the jack in the transverse direction.

The tooling may comprise a plurality of rods that each extend in the transverse direction from either the first member or the second member, the other one of the first member and the second member comprising a first series of secondary recesses, each being adapted to receive, interference-fitted, an end portion of one of the rods. The member provided with the rods can be moved along the transverse direction in step A1_2, or step A2_2, if applicable, by inserting each rod through a respective hole formed through the flange to place the end part of each rod on an opposite side of the flange relative to the member. The other member can be moved in the transverse direction in the other step among step A1_2 and step A2_2 by inserting the end part of each rod into one of the secondary recesses of the member in an interference fit.

An adjusted interference fit between two elements is understood to be a clearance-free fit that does not allow sliding between the two elements. Such a fit may also be simply called an interference fit.

The first member may be provided with rods. The first member may comprise a second series of secondary recesses in each of which one of the rods is an adjusted interference fit.

Each rod can be cylindrical in revolution. Each secondary recess can be cylindrical in revolution. Each secondary recess may have a diameter substantially smaller than a diameter of the corresponding rod.

The second member may comprise a bell that forms the second recess. The second member may comprise a plurality of tubular elements protruding radially outside the bell. Each tubular element may comprise one of the recesses of the first series of secondary recesses.

The first housing may comprise a tubular wall extending along the second transverse axis, the output member comprising an intermediate part that is arranged transversely between the pinion and the second end part and which is received in the tubular wall of the first housing, and wherein the first recess comprises a first part and a second part, the first part of the first recess and the tubular wall of the first housing having a substantially complementary shape adapted to form an adjusted fit, the second part of the first recess and the second end portion of the bearing member having a substantially complementary shape adapted to form an adjusted fit. The first member can be moved transversely during step A1_2 so as to insert the tubular wall of the first member into the first part of the first recess and the second end portion of the output member in the second part of the first recess.

The complementarity of shape between the first part of the recess and the tubular wall of the first member makes it possible to guide the output member in rotation at this end.

The first part of the first recess may be cylindrical in revolution about the second transverse axis. The second part of the first recess may be cylindrical in revolution about the second transverse axis. The tubular wall of the first member may be cylindrical in revolution about the first axis. To allow the adjusted fit, the second end portion of the output member and the second part of the first recess may have a substantially equal diameter. Also, the tubular wall of the first member and the first portion of the first recess may have a substantially equal diameter.

The first recess may comprise an undercut, or a widened or even collar portion, extended transversely by a hole, the undercut forming the first part and the hole forming the second part.

The first housing may comprise a first series of tabs, each tab of the first series being supported in the transverse direction on the first side of the flange, and wherein the adjustment mechanism comprises a second series of tabs, each tab of the second series of tabs bearing in the transverse direction on the second side of the flange, each tab of the second series of tabs being aligned with a tab of the first series of tabs in the transverse direction. During step C, a weld can be carried out at each transverse alignment between one of the tabs of the first series of tabs, the flange and one of the tabs of the second series of tabs.

Each tab of the first series of tabs can be rigidly connected to the main wall. The tubular wall may extend from the main wall in a direction of the transverse direction that is opposite the flange.

The drive mechanism may comprise a plate rigidly connected to the second housing. Each tab of the second series of tabs can be rigidly connected to the plate.

Each tab of the first series of tabs and each tab of the second series of tabs may comprise a respective hole adapted to have one of the rods pass through. The holes formed through each alignment of one of the tabs of the first series of tabs and one of the tabs of the second series of tabs in the transverse direction can be coaxial with one of the holes formed through the flange. The member provided with rods can be moved along the transverse direction in step A1_2, or step A2_2, if applicable, so as to insert each rod through respectively the hole of one of the tabs of the first series of tabs, one of the holes of the flange and the hole of one of the tabs of the second series of tabs.

The first series of tabs and the second series of tabs may each comprise 3 tabs.

The first series of series of tabs may comprise at least one rear tab arranged at a rear end of the first housing in the longitudinal direction. The rear tab may extend in the transverse direction by passing through a third opening through the connecting rod. The third opening may be of rounded shape about the first transverse axis.

The first series of tabs may comprise at least one front tab arranged at a front end of the first housing in the longitudinal direction. The first series of tabs may comprise two front tabs, which can furthermore be connected to each other.

The second series of series of tabs may comprise at least one rear tab arranged at a rear end of the plate in the longitudinal direction. The second series of tabs may comprise at least one front tab arranged at a front end of the plate in the longitudinal direction.

The fastening of the first housing, the flange, and the drive module in step C can be carried out by welding with or without the addition of material.

The fastening of the first housing, the flange, and the drive module in step C can be carried out by laser welding, preferably the laser beam being oriented in the transverse direction, more preferably in a path of the transverse direction going from the second side of the flange toward the first side of the flange.

The fastening of the first housing, the flange, and the drive module in step C can be carried out by MAG (Metal Active Gas) welding.

To this end, the housing may comprise at least one fastening opening (or window) and, for each fastening opening of the housing, the flange may comprise a first fastening opening (or first window) having an edge aligned in the transverse direction with an edge of the associated fastening opening of the housing, a weld bead being deposited together on the edge of the first fastening opening of the flange and the edge of the fastening opening of the housing to secure the housing to the flange. A fastening opening of the housing can be formed through each of the tabs of the first series of tabs. The adjustment mechanism may comprise at least one fastening opening (or window) and, for each fastening opening of the adjustment mechanism, the flange may comprise a second fastening opening (or second window) having an edge aligned in the transverse direction with an edge of the associated fastening opening of the adjustment mechanism, a weld bead being deposited together on the edge of the second fastening opening of the flange and the edge of the fastening opening of the adjustment mechanism so as to secure the adjustment mechanism to the flange. A fastening opening of the adjustment mechanism can be formed through each of the tabs of the second series of tabs. Each fastening opening of the housing is preferably aligned with one of the fastening openings of the adjustment mechanism in the transverse direction such that each first fastening opening of the flange can coincide (or can be merged) with one of the second fastening openings of the flange. The fastening opening(s) of the housing and the fastening opening(s) of the adjustment mechanism are preferably aligned two by two in the transverse direction.

The securing of the housing and the adjustment mechanism to the flange by at least one permanent fastening means can be combined with assembly by clinching or stamping, in particular at the tabs of the first series of tabs of the housing and of the second series of tabs of the adjustment mechanism.

The fastening of the first housing, the flange, and the drive module in step C can be carried out by CMT welding (Cold Metal Transfer).

The frame may comprise a cross-member extending along the first transverse axis, integral with the flange, the connecting rod being pivotably mounted on the cross-member about the first transverse axis, and wherein a pressure is exerted on the cross-member in step B so as to apply the longitudinal force to the connecting rod.

A height adjustment system is also proposed for a seat, in particular capable of being obtained by the method as described above. The height adjustment system for a seat may comprise:

- a seat frame comprising at least:
  - a flange extending a longitudinal direction of the seat and comprising, in a transverse direction, an inner side and an outer side, and
  - a connecting rod pivotably articulated about a first transverse axis relative to the flange, the connecting rod being arranged on a first side of the flange in the transverse direction, coinciding with either the inner side or the outer side, the connecting rod comprising at least one toothed sector;
- a first housing arranged on the first side of the flange in the transverse direction, the toothed sector of the connecting rod being arranged transversely between the first housing and the first side of the flange;
- a drive module comprising at least:
  - an adjustment mechanism, the adjustment mechanism being arranged on a second side of the flange in the transverse direction, opposite the first side, coincident with the other of the inner side or the outer side,
  - an output member extending along a second transverse axis, a first end portion of the output member cooperating with the adjustment mechanism so as to be able to be rotated about the second transverse axis, the output member passing through a first opening through the flange and a second opening through the first housing, a second end portion of the output member being arranged on a first side of the first housing that is opposite the flange in the transverse direction, the output member further comprising at least one pinion arranged at least partially on the first side of the flange, transversely between the flange and the first housing.

According to the present disclosure, the first housing, the flange and the drive module are secured together by at least one permanent fastening means, such as a weld or such as adhesive.

A method for assembling a height adjustment system for a seat comprising a seat frame (10) comprising at least one a flange (11) extending a longitudinal direction (X) and comprising, in a transverse direction (Y), an inner side and an outer side, a first housing (30) arranged on the first side (12) of the flange (11) in the transverse direction (Y), and a drive module (20) comprising an adjustment mechanism (21), the adjustment mechanism (20) being arranged on a second side (13) of the flange (11) in the transverse direction (Y), opposite the first side (12), coincident with the other of the inner side or the outer side, wherein the first housing (30), the flange (11) and the drive module (20) are secured together by at least one permanent fastening means, such as a weld (70) or such as adhesive.

The following numbered clauses include embodiments that are contemplated and non-limiting:

Clause 1. A method (100) for assembling a height adjustment system for a seat, the height adjustment system comprising:

- a seat frame (10) comprising at least:
  - a flange (11) extending a longitudinal direction (X) and comprising, in a transverse direction (Y), an inner side and an outer side, and
  - a connecting rod (14) pivotably articulated about a first transverse axis (A1) relative to the flange (11), the connecting rod (14) being arranged on a first side (12) of the flange (11) in the transverse direction (Y), coinciding with either the inner side or the outer side, the connecting rod (14) comprising at least one toothed sector (15),
- a first housing (30) arranged on the first side (12) of the flange (11) in the transverse direction (Y), the toothed sector (15) of the connecting rod (14) being arranged transversely between the first housing (30) and the first side of the flange (12),
- a drive module (20) comprising at least:
  - an adjustment mechanism (21), the adjustment mechanism (20) being arranged on a second side (13) of the flange (11) in the transverse direction (Y), opposite the first side (12), coincident with the other of the inner side or the outer side,
  - an output member (25) extending along a second transverse axis (A2), a first end portion (26) of the output member (25) cooperating with the adjustment mechanism (21) so as to be able to rotate the output member (25) about the second transverse axis (A2), the output member (25) extending through a first opening (17) through the flange (11) and a second opening (35) through the first housing (30), a second end portion (27) of the output member (25) being arranged on a first side (31*a*) of the first housing that is opposite the flange (11) in the transverse direction (Y), the output member (25) further comprising at least one pinion (28) arranged at least partially between the flange (11) and the first housing (30) in the transverse direction (Y) and cooperating with the toothed sector (15) of the connecting rod (14), the method (100) comprising the steps of:

A. holding the output member (25) of the drive module (20), by means of tooling, in a holding position for which the outlet member (25) is aligned along the second transverse axis (A2) relative to the flange (11), B. applying a force to the connecting rod (14) in the longitudinal direction (X) so as to eliminate any clearance between the toothed sector (15) of the connecting rod (14) and the pinion (28) of the output member (25), C. securing, in particular by at least one permanent fastening means such as a weld (70) or an adhesive, the first housing (30), the flange (11) and the drive module (20), and wherein steps B and C are carried out while the output member (25) is in the holding position.

Clause 2. The method (100) according to the preceding clause, wherein the tool comprises a first member (40) arranged on the first side (12) of the flange (11) and a second member (50) arranged on the second side (13) of the flange (11), and wherein step A comprises the steps of:

A1. Engaging the second end portion (27) of the output member (25) with the first member (40) such that the second end portion (27) and the first member (40) are constrained to rotate and translate in any direction perpendicular to the transverse direction (Y);

A2. Engaging the adjustment mechanism (21) with the second member (50) so that the adjustment mechanism (21) and the second member (50) are constrained to rotate and translate in any direction perpendicular to the transverse direction (Y);

A3. Securing the first member (40) and the second member (50) to the flange (11);

so that the alignment of the output member (25) in the holding position in step A is obtained by the simultaneous implementation of steps A1, A2, A3.

Clause 3. The method (100) according to the preceding clause, wherein the first member (40) comprises a first recess (42), the first recess (42) and the second end portion (28) of the bearing member (25) having a substantially complementary shape adapted to form an adjusted fit, and wherein the adjustment mechanism (21) comprising a second housing (22) and the second member (50) comprising a second recess (52), the second recess (52) and the second housing (22) of the adjustment mechanism (21) having a substantially complementary shape adapted to form an adjusted fit, and wherein step A1 comprises:

A1_1. Positioning the first member (40) on the first side (12) of the flange (11) by transversely aligning the first recess (42) and the second end portion (27) of the output member (25), A1_2. Transversely moving the first member (40) relative to the height adjustment system to insert the second end portion (27) of the output member (25) into the first recess (42) of the first member, and step A2 comprises:

A2_1. Positioning the second member (50) on the second side (13) of the flange (11) by transversely aligning the second recess (52) and the second housing (22) of the adjustment mechanism, A2_2. Transversely moving the second member 50 (50) relative to the height adjustment system to insert the second housing (22) of the adjustment mechanism into the second recess 52 of the second member 50.

Clause 4. The method (100) according to clause 3, wherein the first member (40) is moved transversely during step A1_2 until it bears, directly or indirectly on the first side (12) of the flange (11) in the transverse direction (Y), and the second member (50) is moved transversely during step A2_2 until it bears, directly or indirectly, on the second side (13) of the flange (11) in the transverse direction (Y), and wherein the step A3 comprises applying a force along the transverse direction (Y) to at least one of the first member (40) and the second member (50) so as to clamp the flange (11) in the transverse direction (Y) between the first member (40) and the second member (50).

Clause 5. The method (100) according to clause 3 or 4, the tooling comprising a plurality of rods (60) that each extend in the transverse direction (Y) from one of the first member (40) and the second member (50), the other of the first member (40) and the second member (50) comprising a first series of secondary recesses (43; 54), each being adapted to receive, as interference fit, an end portion of one of the rods (60), wherein the member provided with the rods (60) is moved along the transverse direction (Y) in step A1_2, or the step A2_2 as the case may be, by inserting each rod (60) through a respective hole (18) formed through the flange (11) to place the end part of each rod (60) on an opposite side of the flange relative to the member, and wherein the other member is moved in the transverse direction (Y) in the other step among step A1_2 and step A2_2 by inserting the end part of each rod (60) in one of the secondary recesses (43; 54) of the other member in an adjusted interference fit.

Clause 6. The method (100) according to any one of clauses 3 to 5, wherein the first housing (30) comprises a tubular wall (33) extending along the second transverse axis (A2), the output member (29) comprising an intermediate part (29) which is arranged transversely between the pinion (28) and the second end part (27) and which is received in the tubular wall (33) of the first housing (30), and wherein the first recess (42) comprises a first part (42*a*) and a second part (42*b*), the first part (42*a*) of the first recess (42) and the tubular wall (33) of the first housing having a substantially complementary shape adapted to form an adjusted fit, the second part (42*b*) of the first recess (42) and the second end portion (27) of the bearing member having a substantially complementary shape adapted to form an adjusted fit, and wherein the first member (40) is moved transversely during step A1_2 so as to insert the tubular wall (33) of the first member (40) into the first part (42*a*) of the first recess (42) and the second end portion (27) of the output member (25) in the second part (42*b*) of the first recess (42).

Clause 7. The method (100) according to any one of the preceding clauses, wherein the first housing (30) comprises a first series of tabs (32), each tab (32) of the first series being supported in the transverse direction (Y) on the first side (12) of the flange (11), and wherein the adjustment mechanism (21) comprises a second series of tabs (23*a*), each tab (23*a*) of the second series of tabs (23*a*) bearing in the transverse direction (Y) on the second side (13) of the flange (11), each tab (23*a*) of the second series of tabs (23*a*) being aligned with a tab (32) of the first series of tabs (32) in the transverse direction (Y), and wherein, during step C, a weld (70) is made through each transverse alignment between one of the tabs (32) of the first series of tabs (32), the flange (11) and one of the tabs (23*a*) of the second series of tabs (23*a*).

Clause 8. The method (100) according to any one of the preceding clauses, wherein the fastening of the first housing (30), the flange (11) and the drive module (20) in step C is carried out by a weld (70) with the laser, preferably the beam of the laser being oriented in the transverse direction (Y), preferably in a direction of the transverse direction going from the second side (13) of the flange (11) toward the first side (12) of the flange (11).

Clause 9. The method (100) according to any one of the clauses, wherein the frame comprises a cross-member (16) extending along the first transverse axis (A1), integral with the flange (11), the connecting rod (14) being pivotably mounted on the cross-member about the first transverse axis (A1), and wherein a pressure is exerted on the cross-member (16) in step B so as to apply the longitudinal force to the connecting rod (14).

Clause 10. A height adjustment system for a seat comprising:

a seat frame (10) comprising at least:

a flange (11) extending a longitudinal direction (X) and comprising, in a transverse direction (Y), an inner side and an outer side, and a connecting rod (14) pivotably articulated about a first transverse axis (A1) relative to the flange (11), the connecting rod (14) being arranged on a first side (12) of the flange (11) in the transverse direction (Y), coinciding with either the inner side or the outer side, the connecting rod (14) comprising at least one toothed sector (15), a first housing (30) arranged on the first side (12) of the flange (11) in the transverse direction (Y), the toothed sector (15) of the connecting rod (14) being arranged transversely between the first housing (30) and the first side of the flange (12), a drive module (20) comprising at least:

an adjustment mechanism (21), the adjustment mechanism (20) being arranged on a second side (13) of the flange (11) in the transverse direction (Y), opposite the first side (12), coincident with the other of the inner side or the outer side, an output member (25) extending along a second transverse axis (A2), a first end portion (26) of the output member (25) cooperating with the adjustment mechanism (21) so as to be able to rotate the output member (25) about the second transverse axis (A2), the output member (25) extending through a first opening (17) through the flange (11) and a second opening (35) through the first housing (30), a second end portion (27) of the output member (25) being arranged on a first side (31*a*) of the first housing that is opposite the flange (11) in the transverse direction (Y), the output member (25) further comprising at least one pinion (28) arranged at least partially between the flange (11) and the first housing (30) in the transverse direction (Y) and cooperating with the toothed sector (15) of the connecting rod (14), wherein the first housing (30), the flange (11) and the drive module (20) are secured together by at least one permanent fastening means, such as a weld (70) or such as adhesive.

The invention claimed is:

1. A method for assembling a height adjustment system for a seat, the height adjustment system comprising:

a seat frame comprising at least:

a flange extending a longitudinal direction and comprising, in a transverse direction, an inner side and an outer side, and a connecting rod pivotably articulated about a first transverse axis relative to the flange, the connecting rod being arranged on a first side of the flange in the transverse direction, coinciding with either the inner side or the outer side, the connecting rod comprising at least one toothed sector, a first housing arranged on the first side of the flange in the transverse direction, the toothed sector of the connecting rod being arranged transversely between the first housing and the first side of the flange, a drive module comprising at least:

an adjustment mechanism, the adjustment mechanism being arranged on a second side of the flange in the transverse direction, opposite the first side, coincident with the other of the inner side or the outer side, an output member extending along a second transverse axis, a first end portion of the output member cooperating with the adjustment mechanism so as to be able to rotate the output member about the second transverse axis, the output member extending through a first opening through the flange and a second opening through the first housing, a second end portion of the output member being arranged on a first side of the first housing that is opposite the flange in the transverse direction, the output member further comprising at least one pinion arranged at least partially between the flange and the first housing in the transverse direction and cooperating with the toothed sector of the connecting rod, the method comprising the steps of:

A. holding the output member of the drive module, using tools, in a holding position for which the outlet member is aligned along the second transverse axis relative to the flange, B. applying a force to the connecting rod in the longitudinal direction so as to eliminate any clearance between the toothed sector of the connecting rod and the pinion of the output member, C. securing, in particular by at least one permanent fastening means such as a weld or an adhesive, the first housing, the flange and the drive module, and wherein steps B and C are carried out while the output member is in the holding position.

2. The method of claim 1, wherein the tools comprise a first member arranged on the first side of the flange and a second member arranged on the second side of the flange, and wherein step A comprises the steps of:

A1. Engaging the second end portion of the output member with the first member such that the second end portion and the first member are constrained to rotate and translate in any direction perpendicular to the transverse direction;

A2. Engaging the adjustment mechanism with the second member so that the adjustment mechanism and the second member are constrained to rotate and translate in any direction perpendicular to the transverse direction;

A3. Securing the first member and the second member to the flange;

so that the alignment of the output member in the holding position in step A is obtained by the simultaneous implementation of steps A1, A2, A3.

3. The method of claim 2, wherein the first member comprises a first recess, the first recess and the second end portion of the output member having a substantially complementary shape adapted to form an adjusted fit, and wherein the adjustment mechanism comprising a second housing and the second member comprising a second recess, the second recess and the second housing of the adjustment mechanism having a substantially complementary shape adapted to form an adjusted fit, and wherein step A1 comprises:

A1_1. Positioning the first member on the first side of the flange by transversely aligning the first recess and the second end portion of the output member, A1_2. Transversely moving the first member relative to the height adjustment system to insert the second end portion of the output member into the first recess of the first member, and step A2 comprises:

A2_1. Positioning the second member on the second side of the flange by transversely aligning the second recess and the second housing of the adjustment mechanism, A2_2. Transversely moving the second member relative to the height adjustment system to insert the second housing of the adjustment mechanism into the second recess of the second member.

4. The method of claim 3, wherein the first member is moved transversely during step A1_2 until it bears, directly or indirectly on the first side of the flange in the transverse direction, and the second member is moved transversely during step A2_2 until it bears, directly or indirectly, on the second side of the flange in the transverse direction, and wherein the step A3 comprises applying a force along the transverse direction to at least one of the first member and the second member so as to clamp the flange in the transverse direction between the first member and the second member.

5. The method of claim 3, the tools comprising a plurality of rods that each extend in the transverse direction from one of the first member and the second member, the other of the first member and the second member comprising a first series of secondary recesses, each being adapted to receive, as interference fit, an end portion of one of the rods, wherein the member provided with the rods is moved along the transverse direction in step A1_2, or the step A2_2 as the case may be, by inserting each rod through a respective hole formed through the flange to place the end part of each rod on an opposite side of the flange relative to the member, and wherein the other member is moved in the transverse direction in the other step among step A1_2 and step A2_2 by inserting the end part of each rod in one of the secondary recesses of the other member in an adjusted interference fit.

6. The method of claim 3, wherein the first housing comprises a tubular wall extending along the second transverse axis, the output member comprising an intermediate part which is arranged transversely between the pinion and the second end part and which is received in the tubular wall of the first housing, and wherein the first recess comprises a first part and a second part, the first part of the first recess and the tubular wall of the first housing having a substantially complementary shape adapted to form an adjusted fit, the second part of the first recess and the second end portion of the output member having a substantially complementary shape adapted to form an adjusted fit, and wherein the first member is moved transversely during step A1_2 so as to insert the tubular wall of the first member into the first part of the first recess and the second end portion of the output member in the second part of the first recess.

7. The method of claim 1, wherein the first housing comprises a first series of tabs, each tab of the first series being supported in the transverse direction on the first side of the flange, and wherein the adjustment mechanism comprises a second series of tabs, each tab of the second series of tabs bearing in the transverse direction on the second side of the flange, each tab of the second series of tabs being aligned with a tab of the first series of tabs in the transverse direction, and wherein, during step C, a weld is made through each transverse alignment between one of the tabs of the first series of tabs, the flange and one of the tabs of the second series of tabs.

8. The method of claim 1, wherein the fastening of the first housing, the flange and the drive module in step C is carried out by a weld with a laser, preferably the beam of the laser being oriented in the transverse direction, preferably in a direction of the transverse direction going from the second side of the flange toward the first side of the flange.

9. The method of claim 1, wherein the frame comprises a cross-member extending along the first transverse axis, integral with the flange, the connecting rod being pivotably mounted on the cross-member about the first transverse axis, and wherein a pressure is exerted on the cross-member in step B so as to apply the longitudinal force to the connecting rod.

10. A height adjustment system for a seat comprising:

a seat frame comprising at least:

a flange extending a longitudinal direction and comprising, in a transverse direction, an inner side and an outer side, and a connecting rod pivotably articulated about a first transverse axis relative to the flange, the connecting rod being arranged on a first side of the flange in the transverse direction, coinciding with either the inner side or the outer side, the connecting rod comprising at least one toothed sector, a first housing arranged on the first side of the flange in the transverse direction, the toothed sector of the connecting rod being arranged transversely between the first housing and the first side of the flange, a drive module comprising at least:

an adjustment mechanism, the adjustment mechanism being arranged on a second side of the flange in the transverse direction, opposite the first side, coincident with the other of the inner side or the outer side, an output member extending along a second transverse axis, a first end portion of the output member cooperating with the adjustment mechanism so as to be able to rotate the output member about the second transverse axis, the output member extending through a first opening through the flange and a second opening through the first housing, a second end portion of the output member being arranged on a first side of the first housing that is opposite the flange in the transverse direction, the output member further comprising at least one pinion arranged at least partially between the flange and the first housing in the transverse direction and cooperating with the toothed sector of the connecting rod, wherein the first housing, the flange and the drive module are secured together by at least one permanent fastening means, such as a weld or such as adhesive.

11. A method for assembling a height adjustment system for a seat, the height adjustment system comprising:

a seat frame comprising at least:

a flange extending a longitudinal direction and comprising, in a transverse direction, an inner side and an outer side, and a connecting rod pivotably articulated about a first transverse axis relative to the flange, the connecting rod being arranged on a first side of the flange in the transverse direction, coinciding with either the inner side or the outer side, the connecting rod comprising at least one toothed sector, a first housing arranged on the first side of the flange in the transverse direction, the toothed sector of the connecting rod being arranged transversely between the first housing and the first side of the flange, a drive module comprising at least:

an adjustment mechanism, the adjustment mechanism being arranged on a second side of the flange in the transverse direction, opposite the first side, coincident with the other of the inner side or the outer side, an output member extending along a second transverse axis, a first end portion of the output member cooperating with the adjustment mechanism so as to be able to rotate the output member about the second transverse axis, the output member extending through a first opening through the flange and a second opening through the first housing, a second end portion of the output member being arranged on a first side of the first housing that is opposite the flange in the transverse direction, the output member further comprising at least one pinion arranged at least partially between the flange and the first housing in the transverse direction and cooperating with the toothed sector of the connecting rod, the method comprising the steps of:

A. holding the output member of the drive module, by means of tooling, in a holding position for which the outlet member is aligned along the second transverse axis relative to the flange, B. applying a force to the connecting rod in the longitudinal direction so as to eliminate any clearance between the toothed sector of the connecting rod and the pinion of the output member, C. securing, in particular by at least one permanent fastening means such as a weld or an adhesive, the first housing, the flange and the drive module, and wherein steps B and C are carried out while the output member is in the holding position, wherein the tool comprises a first member arranged on the first side of the flange and a second member arranged on the second side of the flange, and wherein step A comprises the steps of:

A1. Engaging the second end portion of the output member with the first member such that the second end portion and the first member are constrained to rotate and translate in any direction perpendicular to the transverse direction;

A2. Engaging the adjustment mechanism with the second member so that the adjustment mechanism and the second member are constrained to rotate and translate in any direction perpendicular to the transverse direction;

A3. Securing the first member and the second member to the flange;

so that the alignment of the output member in the holding position in step A is obtained by the simultaneous implementation of steps A1, A2, A3.

12. A height adjustment system for a seat comprising:

a seat frame comprising at least:

a flange extending a longitudinal direction and comprising, in a transverse direction, an inner side and an outer side, and a connecting rod pivotably articulated about a first transverse axis relative to the flange, the connecting rod being arranged on a first side of the flange in the transverse direction, coinciding with either the inner side or the outer side, the connecting rod comprising at least one toothed sector, a first housing arranged on the first side of the flange in the transverse direction, the toothed sector of the connecting rod being arranged transversely between the first housing and the first side of the flange, a drive module comprising at least:

an adjustment mechanism, the adjustment mechanism being arranged on a second side of the flange in the transverse direction, opposite the first side, coincident with the other of the inner side or the outer side, an output member extending along a second transverse axis, a first end portion of the output member cooperating with the adjustment mechanism so as to be able to rotate the output member about the second transverse axis, the output member extending through a first opening through the flange and a second opening through the first housing, a second end portion of the output member being arranged on a first side of the first housing that is opposite the flange in the transverse direction, the output member further comprising at least one pinion arranged at least partially between the flange and the first housing in the transverse direction and cooperating with the toothed sector of the connecting rod, wherein the first housing, the flange and the drive module are secured together by a weld, each weld being made through a plate of the adjustment mechanism, the flange and the first housing.

13. A height adjustment system for a seat comprising:

a seat frame comprising at least:

a flange extending a longitudinal direction and comprising, in a transverse direction, an inner side and an outer side, and a connecting rod pivotably articulated about a first transverse axis relative to the flange, the connecting rod being arranged on a first side of the flange in the transverse direction, coinciding with either the inner side or the outer side, the connecting rod comprising at least one toothed sector, a first housing arranged on the first side of the flange in the transverse direction, the toothed sector of the connecting rod being arranged transversely between the first housing and the first side of the flange, a drive module comprising at least:

an adjustment mechanism, the adjustment mechanism being arranged on a second side of the flange in the transverse direction, opposite the first side, coincident with the other of the inner side or the outer side, an output member extending along a second transverse axis, a first end portion of the output member cooperating with the adjustment mechanism so as to be able to rotate the output member about the second transverse axis, the output member extending through a first opening through the flange and a second opening through the first housing, a second end portion of the output member being arranged on a first side of the first housing that is opposite the flange in the transverse direction, the output member further comprising at least one pinion arranged at least partially between the flange and the first housing in the transverse direction and cooperating with the toothed sector of the connecting rod, wherein the first housing, the flange and the drive module are secured together by at least one weld, wherein the first housing comprises at least one fastening opening and, for each fastening opening of the housing, the flange comprises a first fastening opening having an edge aligned in the transverse direction with an edge of the associated fastening opening of the housing, a weld bead being deposited together on the edge of the first fastening opening of the flange and the edge of the fastening opening of the housing to secure the housing to the flange, and wherein the adjustment mechanism comprises at least one fastening opening and, for each fastening opening of the adjustment mechanism, the flange comprises a second fastening opening having an edge aligned in the transverse direction with an edge of the associated fastening opening of the adjustment mechanism, a weld bead being deposited together on the edge of the second fastening opening of the flange and the edge of the fastening opening of the adjustment mechanism so as to secure the adjustment mechanism to the flange, each fastening opening of the first housing being preferably aligned with one of the fastening openings of the adjustment mechanism in the transverse direction such that each first fastening opening of the flange can coincide with one of the second fastening openings of the flange.

* * * * *